US012812412B2

(12) United States Patent
Mueck et al.

(10) Patent No.: US 12,812,412 B2
(45) Date of Patent: Nov. 24, 2026

(54) ENHANCED ON-THE-GO ARTIFICIAL INTELLIGENCE FOR WIRELESS DEVICES

(71) Applicant: INTEL CORPORATION, Santa Clara, CA (US)

(72) Inventors: Markus Dominik Mueck, Unterhaching (DE); Miltiadis Filippou, Munich (DE); Thomas Luetzenkirchen, Taufkirchen (DE); Leonardo Gomes Baltar, Munich (DE)

(73) Assignee: Intel Products IP LLC, Santa Clara, CA (US)

( * ) Notice: Subject to any disclaimer, the term of this patent is extended or adjusted under 35 U.S.C. 154(b) by 297 days.

(21) Appl. No.: 18/575,792

(22) PCT Filed: Aug. 9, 2022

(86) PCT No.: PCT/US2022/039846
§ 371 (c)(1),
(2) Date: Dec. 29, 2023

(87) PCT Pub. No.: WO2023/018726
PCT Pub. Date: Feb. 16, 2023

(65) Prior Publication Data

US 2024/0298194 A1 Sep. 5, 2024

Related U.S. Application Data

(60) Provisional application No. 63/233,151, filed on Aug. 13, 2021, provisional application No. 63/233,153, filed on Aug. 13, 2021.

(51) Int. Cl.
*H04W 24/02* (2009.01)
*H04W 64/00* (2009.01)

(52) U.S. Cl.
CPC .......... *H04W 24/02* (2013.01); *H04W 64/00* (2013.01)

(58) Field of Classification Search
CPC ... H04W 24/02; H04W 64/00; H04W 72/543; H04W 8/20; H04W 8/245; H04L 41/16; G06N 20/00; G06N 3/09; G06N 3/084
See application file for complete search history.

(56) References Cited

U.S. PATENT DOCUMENTS

| | | | | |
|---|---|---|---|---|
| 2013/0268357 | A1* | 10/2013 | Heath | G06Q 10/40 726/26 |
| 2014/0359281 | A1 | 12/2014 | Saboori et al. | |

(Continued)

FOREIGN PATENT DOCUMENTS

| | | | |
|---|---|---|---|
| WO | 2021058328 | A1 | 4/2021 |
| WO | 2021086369 | A1 | 5/2021 |

OTHER PUBLICATIONS

International Search Report and Written Opinion mailed Nov. 21, 2022 in Application No. PCT/US2022/039846, 12 pages.

(Continued)

*Primary Examiner* — Atique Ahmed
(74) *Attorney, Agent, or Firm* — Gray Ice Higdon, PLLC

(57) ABSTRACT

This disclosure describes systems, methods, and devices related to facilitating machine learning-based operations at a User Equipment (UE) connected to a radio access network (RAN). A network AI/ML (artificial intelligence/machine learning) service or function may identify a first request, received from a user equipment (UE) device, for a machine learning model configuration; determine a location of the UE device; select, based on the first request and the location, an available machine learning agent; format a second request to the available machine learning agent for the machine learning configuration; identify the machine learning configuration received from the available machine learn- (Continued)

ing agent based on the second request; and format a response to the first request, the response comprising the machine learning configuration for the UE device.

20 Claims, 14 Drawing Sheets

(56) References Cited

U.S. PATENT DOCUMENTS

| | | | | |
|---|---|---|---|---|
| 2016/0371396 | A1* | 12/2016 | Todd | H04L 9/3247 |
| 2017/0213127 | A1* | 7/2017 | Duncan | G16B 50/30 |
| 2019/0220703 | A1* | 7/2019 | Prakash | G06N 3/09 |
| 2020/0092296 | A1* | 3/2020 | Brinckman | H04W 12/086 |
| 2020/0371509 | A1* | 11/2020 | Mark | G05B 19/4155 |
| 2021/0049466 | A1* | 2/2021 | Milman | G06N 3/0464 |
| 2021/0150521 | A1* | 5/2021 | Pan | H04L 9/3247 |
| 2021/0152455 | A1* | 5/2021 | Castle | H04L 43/0876 |
| 2021/0160812 | A1 | 5/2021 | Manolakos et al. | |
| 2021/0204162 | A1* | 7/2021 | Chunduri | H04W 28/0263 |
| 2021/0274392 | A1* | 9/2021 | Dao | H04W 36/0033 |
| 2021/0286896 | A1* | 9/2021 | Zhang | H04L 67/565 |
| 2021/0357959 | A1* | 11/2021 | Cella | G06Q 10/10 |
| 2022/0247678 | A1* | 8/2022 | Atwal | H04L 45/645 |
| 2022/0294548 | A1* | 9/2022 | Pezeshki | H04W 72/542 |
| 2022/0353803 | A1* | 11/2022 | Wang | G06N 3/09 |
| 2023/0020939 | A1* | 1/2023 | Klein | G06N 3/09 |
| 2023/0036167 | A1* | 2/2023 | Yusuf | G06Q 10/02 |
| 2023/0083982 | A1* | 3/2023 | Xin | H04L 41/16<br>709/223 |
| 2023/0379700 | A1* | 11/2023 | Zhu | H04W 12/037 |

OTHER PUBLICATIONS

3GPP TSG SA "Network Domain Security (NDS); Authentication Framework (AF) (Release 16)" 3GPP TS33.310 V16.8.0., Jun. 2021, 12 pages.

* cited by examiner

850

ENHANCED ON-THE-GO ARTIFICIAL INTELLIGENCE FOR WIRELESS DEVICES

CROSS-REFERENCE TO RELATED APPLICATION(S)

This application is a U.S. National Stage Application under 35 U.S.C. 371 and claims the priority benefit of International Application No. PCT/US2022/039846, filed Aug. 9, 2022, and claims the benefit of U.S. Provisional Application No. 63/233,151, filed Aug. 13, 2021, and to U.S. Provisional Application No. 63/233,153, filed Aug. 13, 2021, the disclosures of which are incorporated by reference as set forth in full.

TECHNICAL FIELD

This disclosure generally relates to systems and methods for wireless communications and, more particularly, to on-the-go artificial intelligence for wireless devices.

BACKGROUND

Wireless devices are becoming widely prevalent and are increasingly using wireless channels. The 3$^{rd}$ Generation Partnership Program (3GPP) is developing one or more standards for wireless communications.

DETAILED DESCRIPTION

Figure 1:
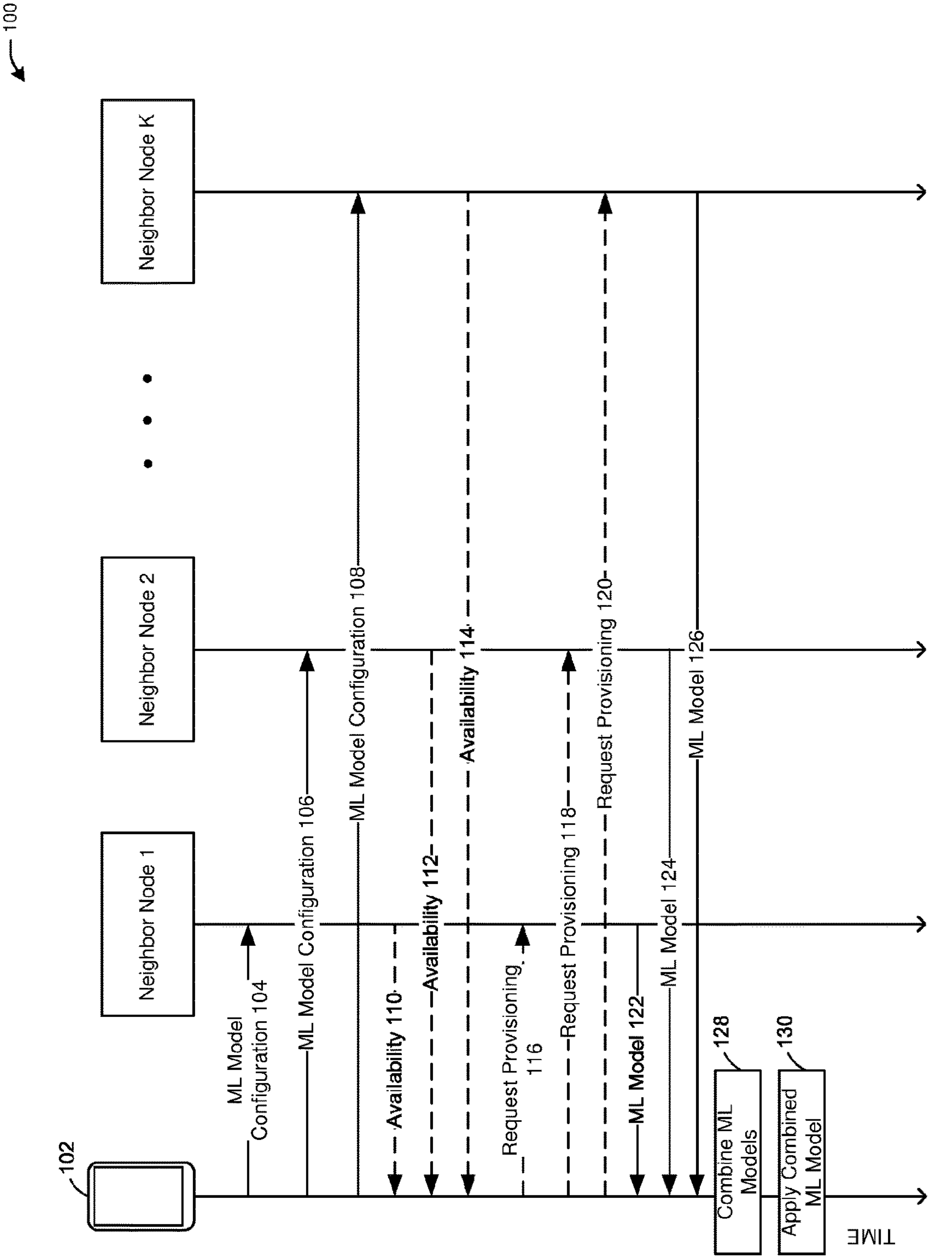
FIG. 1 illustrates an example process for facilitating on-device machine learning operations, according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Wireless devices may operate as defined by technical standards. For cellular telecommunications, the 3$^{rd}$ Generation Partnership Program (3GPP) define communication techniques, including the way that artificial intelligence (AI) is used in wireless communications.

The Hexa-X project, for example, is developing a fabric of connected AI, networks of networks, sustainability, global service coverage, experience, and trustworthiness. However, one challenge with in-network AI/ML (machine learning) is how to enable user equipment (UE) carrying a local ML model (obtained by e.g., training a Neural Network—NN) to seamlessly exploit the knowledge of large parts of the network, useful to its locally undertaken inferencing tasks, by attaching to/detaching from different learning systems (e.g., federations) across multiple operator areas. Criteria calling for such attachments/detachments are (i) UE & coverage-providing network node mobility, (ii) unavailability of an AI agent (e.g., Federated Learning (FL)) aggregator due to e.g., a detected security attack, (iii) low-quality connectivity (impacting crowdsourcing of local models), (iv) increased model aggregation latency and others.

According to the Federated Learning (FL) paradigm, when implemented in a wireless network, an overall (federated) AI/ML model parameter set (for example, weights and biases of a NN), is obtained by iteratively: (i) aggregating updated local models instantiated at UEs participating to the FL setup (hence, avoiding the upload of "raw" training data) and then (ii) forwarding the aggregated model to the UEs for their further local model updates.

The converged FL model is exploited by UEs (both ones contributing local model updates to the FL setup and possibly others) in order to expand the generalization capability of their local models for high-accuracy inferencing. Generalization capability refers to the obtainment of accurate inferencing output when an AI service is queried, regardless of the timing of inferencing request and the location of the AI service consumer.

Nevertheless, a missing gap is that state-of-the-art in-network learning (including FL) implementations prevent seamless exploitation of network knowledge by a UE, due to the following shortcomings:

(1) Lack of robustness to mobility events (UE mobility, but also mobility of the coverage-providing network entity—if mobile—e.g., an Unmanned Aerial Vehicle (UAV) with an Access Point (AP) mounted to it).

(2) Possible unexpected learning system pause (temporary or long-term) due to the unavailability of an AI agent (e.g. a FL aggregator). This may occur due to e.g., a detected security attack (for example, a data poisoning attack, compromise/hijack of the entity hosting the aggregator—such as an edge cloud server) or simply, hardware/software errors.

(3) UEs/members of the learning system experiencing low-quality connectivity to the network node collocated with the FL aggregator. Such low-quality connectivity may occur due to resource contention or due to e.g., deep signal fades experienced during the (iterative) FL model training period.

(4) Increased model training (or, aggregation, in case of a FL setup) latency, due to the lack of available compute resources at the AI agent side, or, in the existence of learning "strugglers" in case of FL, e.g., UEs of low capability being unable to produce their local model updates in a timely fashion.

As referred to herein, a "learning system" may refer to any structure involving one or multiple AI agents deployed across a network coverage area (by a single or multiple MNOs). Examples are: FL, transfer learning, distributed learning, and others.

In addition, there are challenges regarding how to manage different levels of trust and data privacy limitations of AI service consumers, e.g., (i) data or AI/Machine Learning (ML) model contributors, as well as (ii) data analytics consumers/inferencing output providers in future AI-capable 6G networks without constraining learning data supply or inferencing-based feedback, respectively.

In 3GPP the existing security solution for inter-domain communication using Network Exposure Function (NEF) is based on: a) the usage of TLS for authentication, integrity and confidentiality protection and b) the usage of OAuth 2.0 for application function request authorization using Access tokens:

(a) TLS based security architecture (see 3GPP TS 33.310 [1]) for mutual authentication and secure communications: (1) TLS Client CA (Certificate Authority) issues certificates for TLS clients in its domain. (2) TLS Server CA issues certificates for TLS servers in its domain. (3) When interconnect agreement is established between the domains, the interconnect CA cross certifies the TLS client/server CA of the peer domain (e.g., network operator). (4) The created cross certificates are configured locally to each domain.

(b) Service based access using OAuth 2.0 (see RFC 6749): (1) OAuth 2.0 introduces an authorization layer for separating the role of the client from that of the resource (e.g. API function). (2) Access requests to resources (e.g. API function) are controlled by the resource owner and hosted by the resource server using a different set of credentials than those of the resource owner. (3) Clients (e.g. API invoker) use access tokens to access the protected resources hosted by the resource server. (4) Access tokens are issued by an authorization server with the approval of the resource owner.

Per 3GPP Technical Standard 23.501, the Network Exposure Function (NEF) supports a number of functionalities, among which are the following (NWDAF stands for Network Data Analytics Function):

(a) Secure provision of information from external application to 3GPP network: It provides a means for the Application Functions to securely provide information to 3GPP network, e.g. Expected UE Behaviour, 5G-VN group information, time synchronization service information and service specific information. In that case the NEF may authenticate and authorize and assist in throttling the Application Functions.

(b) Exposure of analytics: NWDAF analytics may be securely exposed by NEF for external party, as specified in 3GPP Technical Standard 23.288.

(c) Retrieval of data from external party by NWDAF: Data provided by the external party may be collected by NWDAF via NEF for analytics generation purpose. NEF handles and forwards requests and notifications between NWDAF and AF, as specified in Technical Standard 23.288.

Further, in existing 3GPP 5G NR specifications, there are two levels of trust: i) the trusted network domain and ii) an external (untrusted) domain, separated by a NEF:

(a) Trustworthiness in a future AI-capable 6G network consisting of multiple special-purpose networks: As introduced in project Hexa-X [5], three of the main research challenges to be addressed in order to lay the technical foundation of 6G wireless communications technology are:

(1) Connecting Intelligence: this challenge relates to the implementation of data-centric solutions (e.g., based on Artificial Intelligence (AI)/Machine Learning (ML)) in order to automate network operation, for example, via predictive network resource and service orchestration or by designing air interface functionalities not per state-of-the-art model-based approaches. This challenge needs to also be addressed to re-design the network as a distributed learning platform.

(2) Trustworthiness: this research challenge consists in ensuring data security, privacy, confidentiality and integrity. It is a crucial challenge to be addressed, as involving multiple stakeholders such as application consumers, service providers, network operators and developers. Designing a trustworthy 6G system, however, not at the cost of reducing connecting intelligence (e.g., facilitated by the AI-as-a-Service (AIaaS) concept) should be the goal of 6G system design and optimization.

(3) Network of Networks (NoNs): According to the Hexa-X vision [5]: "6G shall aggregate multiple types of resources, including communication, data and AI processing that optimally connect at different scales, ranging from, e.g., in-body, intra-machine, indoor, data centres, to wide areas networks. Their integration results in an enormous digital ecosystem that grows more and more capable, intelligent, complex, and heterogeneous, and eventually creates a single network of networks. It will serve various needs, support different nodes and means of connectivity, and handle mass-scale deployment and operation fulfilling a large diversity of requirements with utmost (cost) efficiency and flexibility, promoting business and economy growth and addressing major societal challenges, like sustainable development, health, safety, and digital divide".

In addition, one of the identified 6G use case families is the one of "local trust zones for human and machine." According to Hexa-X deliverable D1.2—Expanded 6G vision, use cases and societal values: Including aspects of sustainability, security and spectrum" [6]: "Many use cases, however, require local or private communication capabilities for very sensitive information that are tightly integrated in wide-area networks. Here, network topologies beyond cellular topologies and security concepts beyond classical security architectures are required. Local trust zones protecting individual or machine specific information and independent sub-networks such as body area networks enabling advanced medical diagnosis and therapy or on-board networks of AGVs have to be dynamically and transparently integrated in wide area networks, or remain on-premises as private networks, as needed."

From all the above, it is evident that state-of-the-art standards lack the capability of flexibly managing the different trustworthiness levels and expected data privacy limitations of AI service consumers, e.g., (i) data or AI/Machine Learning (ML) model contributors, as well as (ii) data analytics consumers/inferencing output providers in future AI-capable 6G networks without constraining learning data supply or inferencing-based feedback, respectively.

Various embodiments herein provide an AI Information Service (AIS) and its corresponding AI Application Programing Interface (AI API), implemented over an open network interface. The proposed service and API may enable one or more the following:

A UE (AIS consumer) to communicate to the AIS information relating to a user/client application-specific task (e.g., intention to drive a vehicle from location A to location B, starting at time t) calling for an inferencing-based recommendation (e.g., QoS prediction-based recommendation on switching on/off autonomous driving features) and performance requirements relating to e.g., inferencing accuracy, energy efficiency, end-to-end delay, security and others. All these criteria are filtering criteria for AI agent selection.

The UE, based on AIS response on available AI agent(s) fulfilling the communicated criteria, to (i) in case of a commonly supported application layer protocol, subscribe to, unsubscribe from or update the subscription to one or multiple available AI agents (e.g., FL aggregators) or (ii) in case infrequent/one-time output is needed to obtain the ML model configuration indirectly from the AIS.

Considering each selected AI agent, the UE to share its local model updates to the AI agent(s) it is subscribed to and obtain learning system parameter updates (e.g., aggregated FL model update, transfer of an already trained and tested model) by the subscribed AI agent(s).

The embodiments herein may enable a user (via a User Interface) or a client application to request a parameterization of the device's locally available learning model from the network (under MNO control), given a number of performance requirements set by the user, the client/server application or a user equipment profile. Despite network and/or edge cloud disturbances, full knowledge of the MNO/network can be seamlessly exploited for resolving the specific problem stated by a user without exposing the MNO/network data sets directly to the user. The solution is applicable to safety and dependability-critical environments (automotive, industrial automation and others).

I. Simplest Case: UE (or other network equipment/entity) provides specific problem statement (task description) and performance requirements to the network, obtains connection specifics to AI agent(s) via the AIS, subscribes to the AI agents, and then requests from each of the AI agent(s) to which it is subscribed the parameters of a fully trained model, e.g., a QoS predictor implemented as a NN.

The present disclosure proposes a specific method, applicable to scenarios calling for frequent inferencing-based decisions, that allows a UE (or other equipment/machine) to:

Define and communicate a specific problem statement (e.g., inferencing task) and its performance requirements to the network exploiting the AIS and accompanied Learning API;

Receive the connection endpoint details of the available and relevant (with regards to the focused inferencing task) AI agents it can attach to—such connectivity will abide by performance requirements set by the AIS consumer (e.g., the requesting UE).

Either (i) receive model update notifications from the AI agent it is subscribed to in order to then conduct inferencing locally at the device (e.g., in case the inferencing input data set is large) or (ii) post new data to the data management entity of the AI agent the UE is subscribed to—either new learning data useful for model updating or inferencing input data aiming to obtain inferencing output data in response.

Consequently, by subscribing to the appropriate in-network AI agent(s), the UE (or other equipment) is able to fully exploit the knowledge of a large part of the network, without individually communicating with each and every AI agent, as this is a functionality of the AIS service.

In an example, assume that a vehicle plans to move from location A (e.g., Munich, Germany) to location B (e.g., Stuttgart, Germany). The vehicle trajectory and journey starting time are a-priori known and considered as input features for inferencing. As an example, the vehicle intends to use the Highway "A8" in Germany. Further assume that the concerned vehicle requires a local AI/ML model (e.g., a NN, a regression model for classification, a Support Vector Machine (SVM) etc.) providing recommendations on the following tasks on route to the final destination:

Optimized switch of access technologies (e.g., when to switch from FR1 to FR2 access anticipating loss of coverage, when to switch from 3GPP to public wifi, etc.).

Optimized choice of initial communication parameter values when switching access technologies (e.g., optimized Modulation & Coding Scheme (MCS) selection, anticipation of antenna beam selection, etc.).

Detection of dangerous traffic situations (e.g., obstacles on the road, etc.).

Further assume that the local ML model can be fed with a local input data set consisting of the following exemplary features:

GNSS based positioning information.

Video information (vehicle cameras).

LiDAR information (vehicle LiDAR).

Radar information (vehicle Radar).

Information obtained wirelessly from neighboring vehicles (co-operative perception based data sharing).

A proposal of the present disclosure is that the concerned vehicle acts as follows:

The concerned vehicle (through a Multi-access Edge Computing (MEC) application instantiated at the network's edge corresponding to a client application instantiated at the vehicle) communicates the task description/problem statement to the AIS with the ultimate goal to obtain a fully trained ML model, as instantiated at one or more available AI agents in the network, and customized to address the specific inferencing task with high accuracy. The problem statement can be formed as a data structure (e.g., to be included to the message body of the request) including attributes specific to the task, such as:

a. the task type, such as QoS prediction, obstacle identification etc.

b. the route parameters, e.g., origin and destination locations, intermediate waypoints and planned journey starting time.

c. the inferencing task input features (as mentioned above, e.g., LiDAR information, camera information etc.)
d. the geographic validity area of the model, and
e. optionally—the time period validity of the model.

Furthermore, the concerned vehicle may communicate to the network the task's output features (e.g., "recommended MCS," "recommended Radio Access Technology (RAT)," "autonomous driving mode," etc.) and their possible values (e.g., "3GPP NR" or "WiFi" as values of "recommended RAT," etc.) to be then returned as part of the response message to the UE.

The AIS then identifies the AI agent(s)—carrying ML models—being available, focused on the specific inferencing task and expected to serve the UE under delay, inferencing accuracy, energy efficiency, trustworthiness and other requirements. Once identified, the AIS provides connection information (for example, IP address and port number) of the selected AI agent(s) to the AIS consumer (e.g., the client application at the UE). Then, the AIS consumer at the concerned vehicle subscribes to the identified AI agent(s) aiming to receive the latest model update and finally updates its local model accordingly. The local model is then capable of recommending changes, e.g., in frequency band usage, RAT selection, route change etc.

In one or more embodiments, the AI agents over a given deployment area (and up-to-date inferencing capabilities thereof) are assumed already discovered by the AIS, by e.g., looking up to an AI agent registry maintained at the network side.

In one or more embodiments, an AI agent may be deployed either at the network side (e.g., at the network's edge or in the cloud) or at the UE side.

Embodiments herein may define an AI API involving the following data structures:

Data types to be provided by the AIS/selected AI agent to AIS consumer (e.g., UE)

Data structures to be provided by the network as part of advertising AIS availability and to be used by clients when an inferencing task is created at UE side.

The network (e.g., a Radio Access Network (RAN) overlaid by a MEC deployment) will advertise the offered AI service (AIS) to any attached equipment (UE, machine or other). Since the AIS is assumed aware of the registered AI agents' characteristics (e.g., focused task, I/O inferencing features etc.), as part of service advertisement, it will communicate to potential service consumers the following (empty) data structures:

A data structure describing valid geographic target areas and user movement as well as applicable limitations, for example:

Eventual limitations of the geographic validity area, for example to a country or parts of a country (for example to the areas where a network operator has deployed its network and thus has knowledge to be shared)

Accepted ways of describing the geographic validity area, for example start-point A, end-point B GNSS information, a rectangular shape as a validity area, a circular area defined by a center and a radius etc.

Description of valid trajectories, for example it may be indicated whether certain public highways or other official roads are being used (typically by vehicles); other possibilities include the indication of cycling tracks, pedestrian walkways, hiking trails, off-road tracks, etc. As an extreme case, it may be indicated that the user may move randomly in the assigned geographic area (e.g., the user may not use any official road/path/trail).

A data structure describing the anticipated time period for the movement, for example:

Exact day and time, for example is it a week-end day, a public holiday, a day during vacation time, a normal working day, etc.

Concerning the time, it may be indicated a specific period (e.g. anticipated start time is xx:xx hours and anticipated arrival time is yy:yy hours) or a rough indication of the period, e.g. morning, noon, afternoon, evening, night, morning/evening rush-hour time, etc.

A data structure describing the inferencing task input attributes, data points of which are locally available to the UE, for example:

GNSS based positioning information.

Video information (vehicle cameras).

LiDAR information (vehicle LiDAR).

Radar information (vehicle Radar).

Information obtained wirelessly from neighboring vehicles (co-operative perception based data sharing).

Accelerometer information.

NW based equipment tracking information (e.g., triangulation based positioning).

A data structure describing the inferencing output features to be locally used by the UE, for example.

"handover" information (e.g., when to switch from 3GPP to public WiFi or vice versa, etc.).

Anticipated best configuration for network switch (e.g., anticipated MCS, anticipated best frequency band (e.g., FR1 or FR2), anticipated best antenna beam configuration, etc.).

Anticipated danger ahead (e.g., obstacle on the road, etc.).

In one or more embodiments, new inferencing requests related to new applications' tasks, so far unknown to the network (the AIS), may create the need to specify new data structures. However, in general, communication of invalid data structures by the AIS consumer (or incorrect parameters of known data structures) will trigger a "400 Bad Request" response message in case the AI API is structured as a RESTful API based on HTTPS requests.

Data structure to be provided to the AIS consumer (e.g. client application at the UE) by an AI agent satisfying the AIS consumer criteria.

The data structure to be provided to the AIS consumer by an AI agent satisfying the AIS consumer criteria (after the AIS consumer subscribes to this AI agent) consists of the following exemplary attributes:

Type of model, e.g. NN, Tree based estimation, Bayesian estimator, etc.

Characteristics of the model, e.g. number of layers of the NN, number of nodes per layer, etc.

Number of inputs (plus bits per input data point), number of outputs (plus bits per output).

Maximum latency to obtain inferencing result, etc.

Requirements on inferencing (prediction, estimation etc.) accuracy, trustworthiness etc.

Data types to be provided by the AIS consumer (e.g., UE) to the AIS once a task creates the need for inferencing decisions/recommendations.

When an AIS consumer requests to the AIS to receive an ML model configuration by an available AI agent, the following data structure is contained in the message body of the request (assuming AI API is a RESTful API):

Data structures to be provided as part of the request (considered as filtering criteria of the AIS consumer to be implemented for AI agent selection):

Description of a Use Case. Example: We indicate that a user is moving from point A to point B in a geographic area (e.g., by car on a road, by bike on a bike track, walking anywhere, etc.) and we need the ML model to be optimized for this specific trajectory in this specific geographic area.

Required input features to the trained (NN, etc.) ML model in the UE. Example: The UE may indicate to the network the input data attributes, e.g., available sensors, e.g. GNSS, video, etc. After obtaining the trained model, the UE will apply these inferencing inputs to the NN in order to obtain an action recommendation (e.g., change of MCS scheme etc.).

Required output features to the (NN, etc.) ML model in the UE. Example: The UE may indicate to the network the required output features, e.g. warning about obstacles, predictive configuration of the modem (best configuration), etc.

Required characteristics of the (NN, etc.) ML model in the UE. Example: Number of NN layers, NN nodes per layer, number of NN inputs, number of outputs, size per input/output data point (in bits), maximum latency, etc.

Data structure to only be provided as part of the AIS response to the AIS consumer (e.g., UE):

(For direct communication between UE and AI agent—need to both follow the same application layer protocol): the AIS provides the connection information of the selected AI agent satisfying the selection filtering criteria provided by the AIS consumer (e.g., the UE).

(For indirect communication between the UE and the AI agent via the AIS): The AIS provides the latest update of the selected ML model satisfying the AIS consumer's AI agent filtering criteria to the UE. The UE will thus be able to implement a model containing a broader knowledge of the network without exchanging raw data and without reaching out to all available AI agents individually.

In one or more embodiments, whether direct (involving a subscription to the selected AI agent(s)) or indirect AIS consumer (e.g., UE) and AI agent communication is better applicable depends on: (i) the considered scenario—whether it involves a single one or periodic/frequent inferencing-based decisions and (ii) whether the UE and the selected AI agent can communicate via a common application layer protocol. For example, in case a single prediction is needed, the indirect communication case may be better as there is no need to subscribe to ML model updates. However, in the case of e.g., QoS prediction for a given vehicle trajectory, subscription to AI agent model updates may be needed as multiple predictions may need to be performed (e.g., for different parts of the route or even more fine-grained predictions referring to the same waypoint).

In one or more embodiments, un-subscription from an AI agent or subscription updates may be needed in case e.g., the UE moves away from the network entity (e.g., MEC host) hosting the AI agent. In this case, the AIS needs to be contacted again with updated filtering criteria, in order to target AI agents hosting models relevant to the problem/task which can provide their updated ML models with low latency.

II. Selection of different learning federations to exchange/optimize models:

In the second case, assume a multi-node scenario: Instead of a single network attachment point for requesting a specific model, it is assumed that each of a multitude of network nodes may have its fully trained model available within an AI agent. In an Intelligent Transport Systems (ITS) context, this may for example correspond to neighboring vehicles deriving models based on their local observations and possibly combined with information from other sources (e.g., other vehicles, the network, edge nodes, road side units, etc.).

As a starting point, assume a scenario similar to the one indicated above. e.g., we have a network entity (e.g., a UE) which has a need for a specific ML model (e.g., a QoS predictor). The data structure describing the task and model (e.g., NN) I/O features and characteristics (filtering criteria) which aims to be sent as part of the message body of a request to the AIS is the following:

Description of a Use Case. Example: We indicate that a user is moving from point A to point B in a geographic area (e.g., by car on a road, by bike on a bike track, walking anywhere, etc.) and we need the ML model to be optimized for this specific trajectory in this specific geographic area.

Required input features to the trained (NN, etc.) ML model in the UE. Example: The UE may indicate to the network the input data attributes, e.g., available sensors, e.g. GNSS, video, etc. After obtaining the trained model, the UE will apply these inferencing inputs to the NN in order to obtain an action recommendation (e.g., change of MCS scheme etc.).

Required output features to the (NN, etc.) ML model in the UE. Example: The UE may indicate to the network the required output features, e.g. warning about obstacles, predictive configuration of the modem (best configuration), etc.

Required characteristics of the (NN, etc.) ML model in the UE. Example: Number of NN layers, NN nodes per layer, number of NN inputs, number of outputs, size per input/output data point (in bits), maximum latency, etc.

In one or more embodiments, the data structure (AI agent selection filtering criteria) may be announced (for example through a broadcast or multicast connection to neighboring nodes) to any suitable recipient within range in case of non-availability of the AIS. The recipients may then answer through one of the following ways:

Solution 1: Each recipient (AI agent) may modify its model in way such that the filtering criteria are satisfied, Solution 2: Each recipient (AI agent) may propose the provision of a suitable model configuration upon request. Only if the originating network entity (e.g., UE) acknowledges that the information should be provided, the exact configuration of the model is being provided, Solution 3: In case that multiple broadcast message recipients (AI agents) have a suitable model (for example in the context of a large number of vehicles or pedestrians in the neighborhood), either (i) a random selection will be performed on which node will finally provide the estimator configuration information or (ii) they will all be selected and an averaged model will be provided to the requesting network node (e.g., UE) via single base station/access point connectivity. Those selected nodes convey the information to the originating node.

In solution 3, model averaging/aggregation will be performed exploiting wireless/wired backhaul connections. The averaged/aggregated model can be transmitted by the base station (BS)/access point (AP) the UE is attached to.

The originating node may then proceed in multiple possible ways:

Solution 1: The originating node may identify the single "best fit" for the requested characteristics of the anticipated model and utilize this one only. All other proposals are being discarded.

Solution 2: The originating node may identify a number (>1) of "best fits" or all of the provided model configurations. Those are then combined into a new aggregated/averaged model following the basic principles of FL or similar.

Embodiments herein also provide a framework of managing multiple cross-domain (e.g., cross-MNO, cross-geographical region) AI service consumer (e.g., data contributors, AI agents) trust levels (e.g., from globally trusted in all network deployments to globally untrusted) taking into account the AI service consumer's data privacy limitations set within each security domain. Solution components of the proposed framework include one or more of the following:

1. Each trust level is proposed to be separated from others through a specific "Network Exposure Function (NEF) of Level X". Each AI agent can access private/secure user device data with no additional authorization only in case these user devices are of the same trust level.
2. An interoperable AI Information Service (AIS) (e.g., part of a Multi-access Edge Computing—MEC Service Registry or implemented as a service-producing MEC application)—with an AI API consumed over an open network interface—when consumed by e.g., an AI agent needing to train/update its ML model, advertises the request and, based on responses, it prioritizes data acquisition coming from providers (UEs, machines, other AI agents) of widest cross-domain trust level and most relaxed data privacy constraints within the concerned domains to mitigate biasing of AI/ML-based decisions that would be otherwise taken based only on data originating from providers of the same trust level.
3. To avoid cases of, for example, insufficient data acquisition, leading to AI agent unavailability (or, poor inferencing performance), it is proposed to introduce a "generalization score" of the trained/updated ML model (highest when learning data coming from contributors belonging to different trust levels, lower otherwise). Based on this score, it will, thus, be up to a calling AI service consumer to use or not the trained (originally or updated) model for needed decisions.
4. An additional solution component is based on Zero-Trust Architecture as defined in NIST SP800-207. In this solution communication partners authenticate each other and all communication is secured regardless of the network location. A Policy Enforcement Point (PEP) performs AI service consumer request access control and proposes a trust level per AI task request based on policies provided by a Policy Decision Point (PDP), observable state of client identity, AI task type, requested AI resources, location information, other behavioral and environmental attributes. Data anonymization is performed by the data producer itself based on the proposed trust level.

Embodiments herein may enable fine-grained, privacy-preserving user (or any other data-contributing entity) data lifecycle management (LCM) across security domains of a network, where the data is aimed to be used for AI/ML-model training/updating purposes. A device user (or any other data contribution entity in the network) can indicate data attributes of a specific client application instantiated to the device/User Equipment (UE), or machine as private/confidential or publicly shareable. Learning data LCM will then take place following strictly the user data privacy preferences either for the whole data set lifecycle (e.g., till time of data deletion) or for specific timeframes. This management framework is also beneficial to AI agents carrying models, as it reduces the surface of data poisoning attacks.

Figure 3:
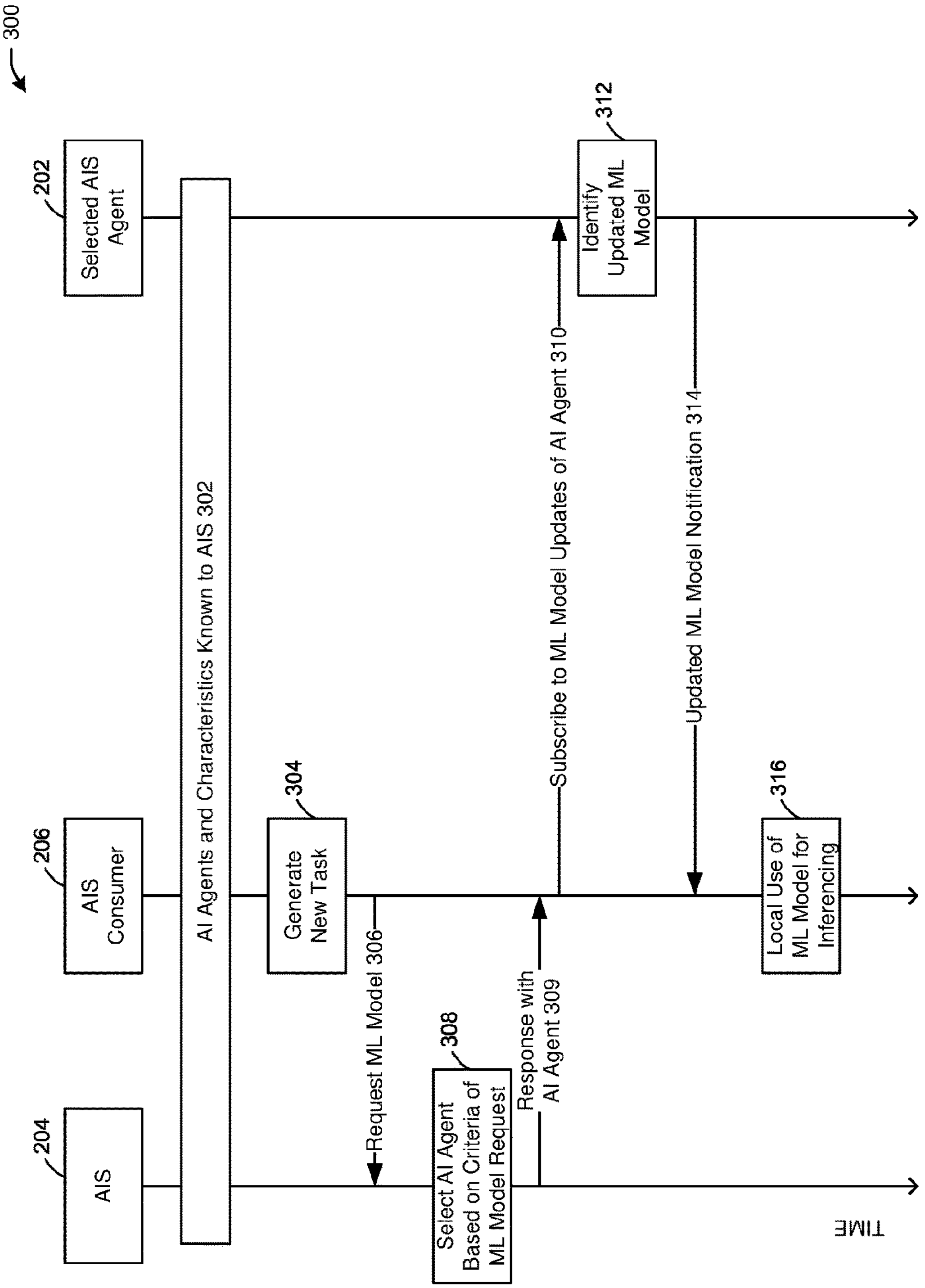
FIG. 3 illustrates an example process for facilitating on-device machine learning operations, according to some example embodiments of the present disclosure.

In one or more embodiments one solution includes defining a "Network Exposure Function (NEF) of Level X" per trust level. The proposal is to introduce a hierarchy of NEFs of different trust level, as illustrated in FIG. 3. For example, within a "Level-0 Trusted Domain", an Application Function, such as an AI agent instantiated within this domain, is allowed to request and acquire all available data by user devices being also local to the same domain, even those indicated as "private" or "confidential" without the need to provide additional authorization credentials. In other words, depending on the level of trust in the part of the network where an AI agent is instantiated, the AI agent (assuming it is already authenticated and authorized by the respective NEF) will only be able to acquire data marked as private and/or secure, per the requirements of the specific trust level. Acquisition of private data external to a given trust level the AI agent is part of will only be possible upon providing additional authorization credentials.

In order to implement the upper framework, the following evolution of the 5G Service based architecture is being proposed, e.g. a single "NEF" is replaced by multiple "NEF-x" functions which provide a differentiated access to various levels of privacy information.

In one or more embodiments, there may be a cross-domain trust level management approach when resource (e.g., data contributor and AI agent containing a model) location is considered as a contextual criterion of implementing data ingress/egress filtering per a predefined policy at each trust level—in this case, a given NEF is considered as a "gatekeeper" entity implementing that policy.

In one or more embodiments, there may be a principle when multiple AI Service consumers (e.g., inference decision requestors) instantiated at different trusted domains (per a contextual criterion, such as location) obtain inferencing output by an AI agent that is of a given level of trust. As before, the multiple NEFs act as "gatekeepers" of their respective trusted domains.

Different types of contextual information can be considered, based on which the throttling (or, "masking," including encryption) of private/secure (training or I/O inferencing) data is implemented across two or more trusted domains. Examples refer to user/device location, time of request, device type and others.

In one or more embodiments one solution includes using a trust level and user privacy-aware data acquisition prioritization. An interoperable AI Information Service (AIS) (e.g., part of a Multi-access Edge Computing—MEC Service Registry or implemented as a service-producing MEC application)—with an AI API consumed over an open network interface—when consumed by e.g., an AI agent needing to train/update its ML model, advertises the request and, based on responses, it prioritizes data acquisition coming from providers (UEs, machines, other AI agents) of widest cross-domain trust and most relaxed data privacy constraints within the concerned domains to mitigate biasing of AI/ML-based decisions that would be otherwise taken based only on data originating from providers at or above trust level.

In one or more embodiments, to avoid cases of, for example, insufficient data acquisition, leading to AI agent unavailability, one solution includes introducing a "generalization score" indicating the cross-domain learning data base considered for AI/ML model update by an AI agent, highest when learning data coming from contributors belonging to multiple trust levels, lower otherwise. Based on this score, it will, thus, be up to the calling AI service consumer to use or not the trained (originally or updated) model for needed decisions.

In one or more embodiments one solution includes using Zero-Trust architecture. This solution proposes a Zero-Trust Architecture that is based on zero trust principles and designed to prevent data breaches and limit internal lateral movement. It adopts the Tenets for Zero Trust architecture as defined by the US National Institute of Standards and Technology NIST SP800-207. The seven Tenets from NIST SP800-207 are summarized below in Table 1 for reference:

TABLE 1

| Zero-Trust Architecture Tenets from NIST SP800-207: | |
|---|---|
| 1. | All data sources and computing services are considered resources. A network may be composed of multiple classes of devices. A network may also have small footprint devices that send data to aggregators/storage, software as a service (SaaS), systems sending instructions to actuators, and other functions. Also, an enterprise may decide to classify personally owned devices as resources if they can access enterprise-owned resources. |
| 2 | All communication is secured regardless of network location. Network location alone does not imply trust. Access requests from assets located on enterprise-owned network infrastructure (e.g., inside a legacy network perimeter) must meet the same security requirements as access requests and communication from any other nonenterprise-owned network. In other words, trust should not be automatically granted based on the device being on enterprise network infrastructure. All communication should be done in the most secure manner available, protect confidentiality and integrity, and provide source authentication. |
| 3 | Access to individual enterprise resources is granted on a per-session basis. Trust in the requester is evaluated before the access is granted. Access should also be granted with the least privileges needed to complete the task. This could mean only "sometime recently" for this particular transaction and may not occur directly before initiating a session or performing a transaction with a resource. However, authentication and authorization to one resource will not automatically grant access to a different resource. |
| 4 | Access to resources is determined by dynamic policy-including the observable state of client identity, application/service, and the requesting asset-and may include other behavioral and environmental attributes. An organization protects resources by defining what resources it has, who its members are (or ability to authenticate users from a federated community), and what access to resources those members need. For zero trust, client identity can include the user account (or service identity) and any associated attributes assigned by the enterprise to that account or artifacts to authenticate automated tasks. Requesting asset state can include device characteristics such as software versions installed, network location, time/date of request, previously observed behavior, and installed credentials. Behavioral attributes include, but not limited to, automated subject analytics, device analytics, and measured deviations from observed usage patterns. Policy is the set of access rules based on attributes that an organization assigns to a subject, data asset, or application. Environmental attributes may include such factors as requestor network location, time, reported active attacks, etc. These rules and attributes are based on the needs of the business process and acceptable level of risk. Resource access and action permission policies can vary based on the sensitivity of the resource/data. Least privilege principles are applied to restrict both visibility and accessibility. |
| 5 | The enterprise monitors and measures the integrity and security posture of all owned and associated assets. No asset is inherently trusted. The enterprise evaluates the security posture of the asset when evaluating a resource request. An enterprise implementing a ZTA should establish a continuous diagnostics and mitigation (CDM) or similar system to monitor the state of devices and applications and should apply patches/fixes as needed. Assets that are discovered to be subverted, have known vulnerabilities, and/or are not managed by the enterprise may be treated differently (including denial of all connections to enterprise resources) than devices owned by or associated with the enterprise that are deemed to be in their most secure state. This may also apply to associated devices (e.g., personally owned devices) that may be allowed to access some resources but not others. This, too, requires a robust monitoring and reporting system in place to provide actionable data about the current state of enterprise resources. |

TABLE 1-continued

| Zero-Trust Architecture Tenets from NIST SP800-207: | |
|---|---|
| 6 | All resource authentication and authorization are dynamic and strictly enforced before access is allowed. This is a constant cycle of obtaining access, scanning and assessing threats, adapting, and continually reevaluating trust in ongoing communication. An enterprise implementing a ZTA would be expected to have Identity, Credential, and Access Management (ICAM) and asset management systems in place. This includes the use of multifactor authentication (MFA) for access to some or all enterprise resources. Continual monitoring with possible reauthentication and reauthorization occurs throughout user transactions, as defined and enforced by policy (e.g., time-based, new resource requested, resource modification, anomalous subject activity detected) that strives to achieve a balance of security, availability, usability, and cost-efficiency. |
| 7 | The enterprise collects as much information as possible about the current state of assets, network infrastructure and communications and uses it to improve its security posture. An enterprise should collect data about asset security posture, network traffic and access requests, process that data, and use any insight gained to improve policy creation and enforcement. This data can also be used to provide context for access requests from subjects (see Section 3.3.1). |

In the proposed solution, the AI service producer (e.g., selected AI agent(s)), AI service consumer and AI function are considered as resources (Tenet 1). Resources are using X.509 certificates for mutual authentication and TLS or QUIC[8] for secure communication (Tenet 2). Access to an individual AI service producer is granted on a per-AI task basis by an AI policy enforcement function (Policy Enforcement Point PEP) using OAuth 2.0 access tokens (Tenet 3). For deciding access, the AI policy enforcement function uses network configured access policies (Policy Decision Point PDP), observable state of client identity, AI task type, requested AI resources, location information, other behavioral and environmental attributes (Tenet 4). As part of the access grant the AI policy enforcement determines the trust level and includes it in the OAuth 2.0 access token. The AI service consumer provides the AI task request together with the OAuth 2.0 access token to the selected AI Agent. An AI orchestration function collects the current state of AI resources, network infrastructure and communications and uses it to improve its security posture (Tenet 7).

The AI service producer (selected AI agent(s)) performs data anonymization based on the AI service consumer trust level as assigned by the AI policy enforcement function. In this Trust Level 0 provides the highest level of trust were no output data filtering is performed. Accordingly, higher numbers provide lower level of trusts with more data filtering.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 illustrates an example process 100 for facilitating on-device machine learning operations (e.g., in a federated machine learning environment), according to some example embodiments of the present disclosure.

Referring to FIG. 1, the process 100 may include a UE 102 that may communicate with multiple neighbor nodes (e.g., neighbor node 1, neighbor node 2, . . . , neighbor node K), functioning as AI agents, to receive ML configurations (equivalently, ML models) from the neighbor nodes. For example, the UE 102 and the neighbor node 1 may provision a ML model configuration 104, the UE 102 and the neighbor node 2 may provision a ML model configuration 106, and the UE 102 and the neighbor node 3 may provision a ML model configuration 106. Optionally, the neighbor nodes may indicate their availability to the UE 102. For example, the neighbor node 1 may indicate its availability 110 to the UE 102, the neighbor node 2 may indicate its availability 112 to the UE 102, and the neighbor node 3 may indicate its availability 114 to the UE 102. Optionally, the UE 102 may request ML provisioning from the neighbor nodes. For example, the UE 102 may request provisioning 116 from the neighbor node 1, the UE 102 may request provisioning 118 from the neighbor node 2, and the UE 102 may request provisioning 120 from the neighbor node 3. The neighbor nodes may provide their ML models to the UE 102. For example, the neighbor node 1 may provide ML model 122 to the UE 102, the neighbor node 2 may provide ML model 124 to the UE 102, and the neighbor node 3 may provide ML model 126 to the UE 102. The UE 102 at step 128 may combine the ML models received from the neighbor nodes into an aggregated ML model, and at step 130 may apply the aggregated ML model (e.g., for inferencing). In this manner, the neighbor nodes may facilitate on-device machine learning operations by providing different ML modes (for example, standalone ones or as a result of federated learning) to the UE 102 to use locally at the UE 102.

Figure 2:
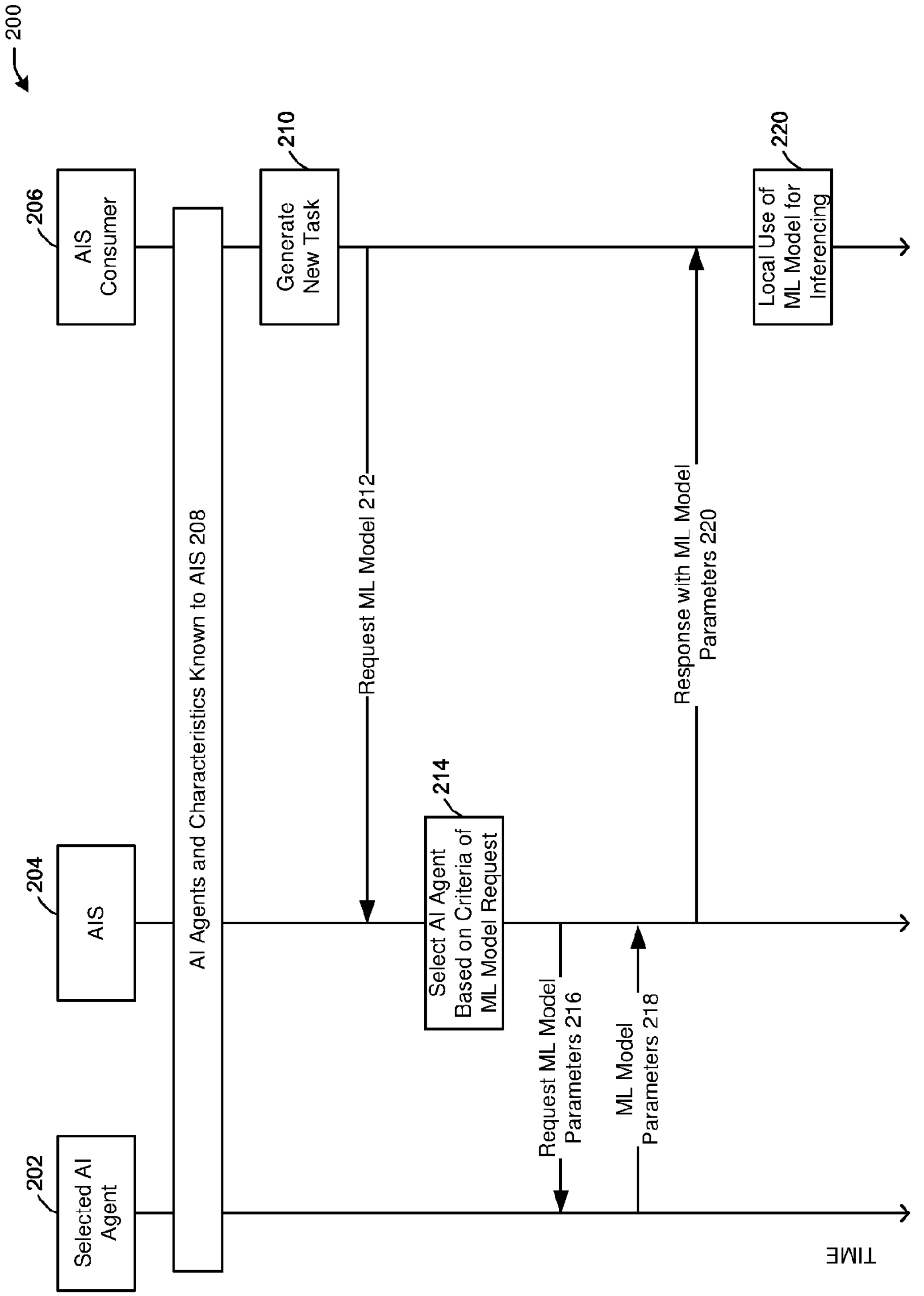
FIG. 2 illustrates an example process for facilitating on-device machine learning operations, according to some example embodiments of the present disclosure.

FIG. 2 illustrates an example process 200 for facilitating on-device machine learning operations, according to some example embodiments of the present disclosure.

Referring to FIG. 2, the process 200 may include a selected AI agent 202 (e.g., a federated learning aggregator having one or more ML models), AIS 204, and an AIS consumer 206 (e.g., the UE 102 of FIG. 1). As a precondition 208, AI agents (e.g., the selected AI agent 202 from among multiple AI agents) and their characteristics (e.g., availability, location coverage, security trust levels, etc.) may be known to the AIS 204. At step 210, the AIS consumer 206 may generate a new task (e.g., an inferencing task), and then may request a ML model at step 212, identifying the task. At step 214, the AIS 204 may select an available AI agent (e.g., the selected AI agent 202) from among multiple AI agents based on criteria included in the request (e.g., UE location/mobility). Once the AIS 204 has selected the selected AI agent 202, the AIS 204 may request the ML model parameters at step 216 based on the request from the UE 102 at step 212. The selected AI agent 202 may return the ML model parameters at step 218, and the AIS 204 may respond to the request at step 212 by providing the ML model parameters from the selected AI agent 202 at step 220. The AIS consumer 206 may use the ML model for inferencing tasks at step 220.

FIG. 3 illustrates an example process 300 for facilitating on-device machine learning operations, according to some example embodiments of the present disclosure.

Referring to FIG. 3, the AIS 204, the AIS consumer 206, and the selected AIS agent 202 of FIG. 2 begin with the precondition 302 that the AI agents and their characteristics are known to the AIS 204. The AIS consumer 206 may generate an inferencing task at step 304, and may request a corresponding ML model for the task at step 306. The AIS 204 may select the selected AI agent 202 based on the criteria in the request. At step 309, the AIS 204 may respond to the AIS consumer 206 by providing an indication of the selected AIS agent 202. The AIS consumer 206 may subscribe to the selected AIS agent 202 for ML model updates at step 310. When the selected AIS agent 202 updates an ML model at step 312, the AIS agent 202 may send the updated ML model at step 314 to the AIS consumer 206 for local use at step 316.

Figure 4:
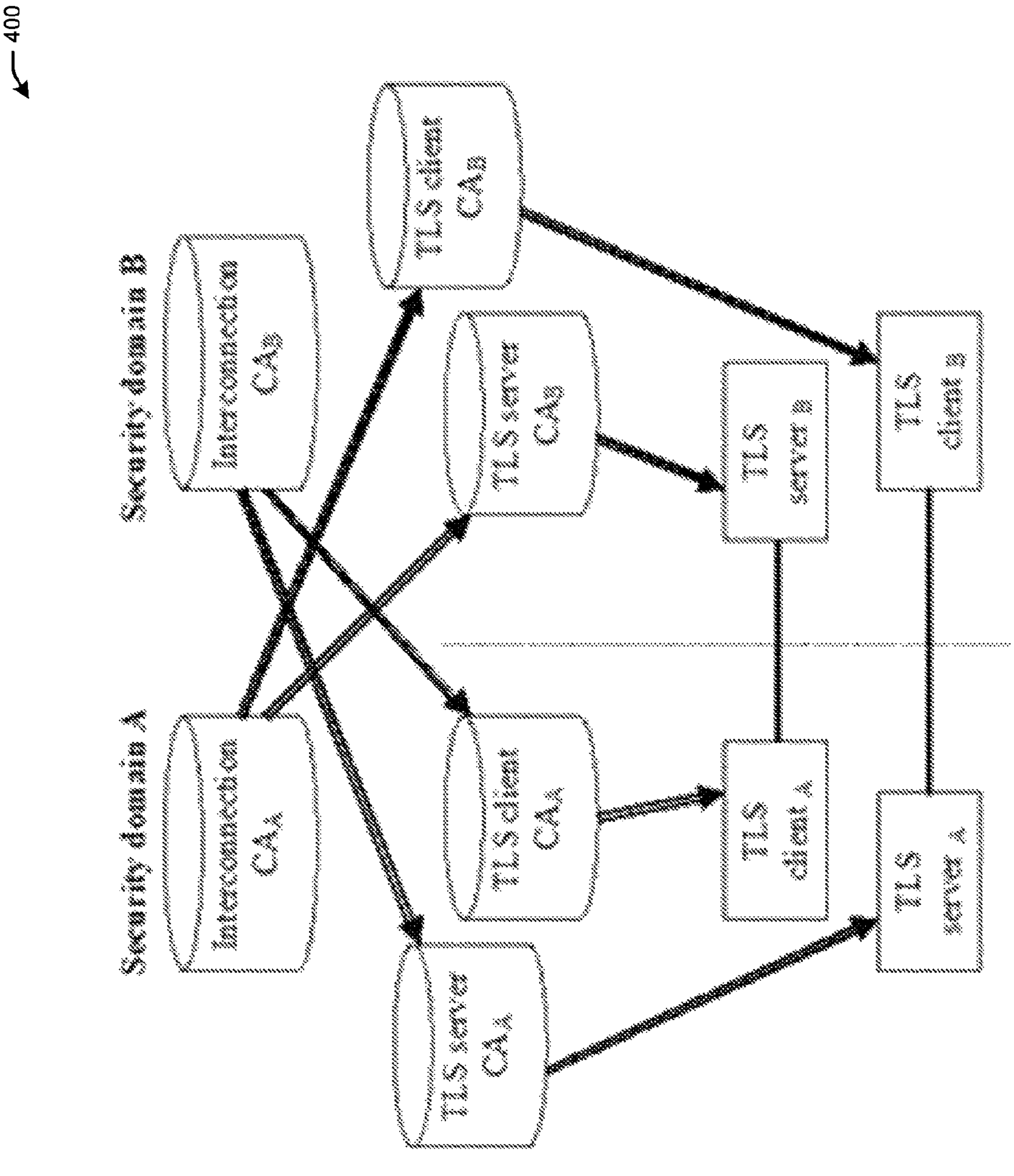
FIG. 4 is a network diagram illustrating an example transport layer security (TLS) architecture, according to some example embodiments of the present disclosure.

FIG. 4 is a network diagram illustrating an example transport layer security (TLS) architecture 400, according to some example embodiments of the present disclosure.

Referring to FIG. 4, the TLS architecture 400 is defined by 3GPP technical standard 33.310. The arrows in FIG. 4 indicate the issuance of security certificates. A TLS Client CA (Certificate Authority) issues certificates for TLS clients in its domain. A TLS Server CA issues certificates for TLS servers in its domain. When an interconnect agreement is established between the domains, the interconnect CA cross certifies the TLS client/server CA of the peer domain (e.g., network operator). The created cross certificates are configured locally to each domain.

Figure 5:
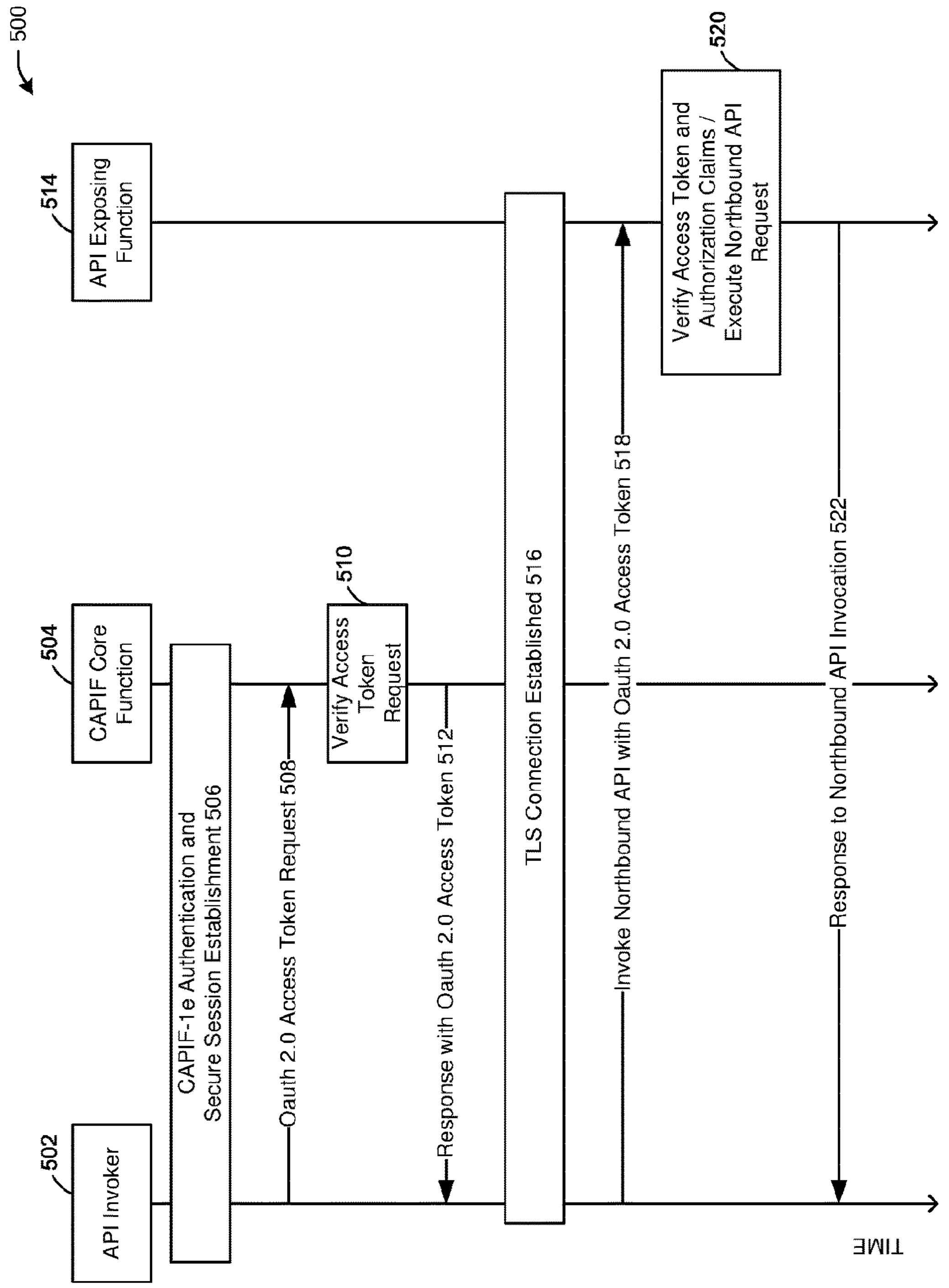
FIG. 5 illustrates an example process for using an OAuth 2.0 authorization protocol, according to some example embodiments of the present disclosure.

FIG. 5 illustrates an example process 500 for using an OAuth 2.0 authorization protocol, according to some example embodiments of the present disclosure. The process 500 may be facilitated by a NEF as defined by 3GPP TS 33.122.

Referring to FIG. 5, an API invoker 502 (e.g., a client device such as the UE 102 of FIG. 1) and a common application programming interface (API) framework (CAPIF) core function 504 may establish a secure session at step 506. The API invoker 502 may send an OAuth 2.0 access token request 508 to the CAPIF core function 504, which may verify the request at step 510, and when verified, may send a response 512 with an OAuth 2.0 access token. At step 516, a TLS connection may be established with an API exposing function 514. At step 518, the API invoker 502 may invoke a northbound API with the Oauth 2.0 provided by the CAPIF core function 504. At step 520, the API exposing function 514 may verify the access token and execute the northbound API request, and at step 522, may respond to the northbound API invocation.

Figure 6:
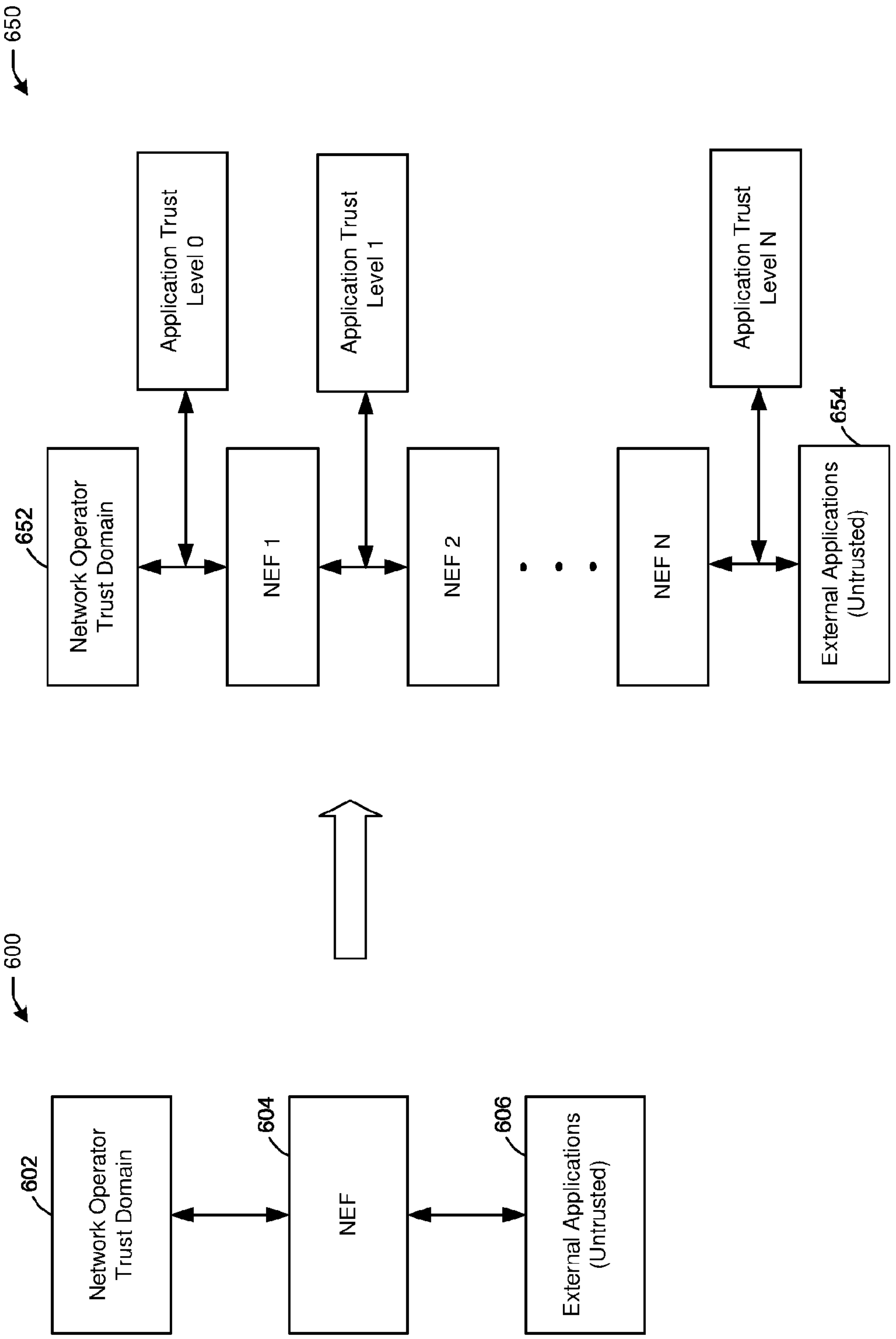
FIG. 6 illustrates example trust level-based communication network frameworks, according to some example embodiments of the present disclosure.

FIG. 6 illustrates example trust level-based communication network frameworks, according to some example embodiments of the present disclosure.

Referring to FIG. 6, a trust level-based communication network framework 600 may include a network operator trust domain 602, an NEF 603, and external applications 606 (e.g., untrusted applications).

Still referring to FIG. 6, a trust level-based communication network framework 650 may include multiple NEFs for different trust levels. For example, a network operator trust domain 652 may communicate with NEF 1, NEF 2, . . . , NEF N, and external (e.g., untrusted) applications 654. For each incrementing NEF, the data accessible to an AI agent may be more and more limited. Application Trust Level 0 may use NEF 1 and may have access to all available data (e.g., no privacy filtering needed). Application Trust Level 2 may use NEF 3 and may have access to some available data (e.g., some privacy filtering needed). Application Trust Level N may use NEF N and may have access to very limited available data (e.g., significant privacy filtering needed, allowing for UE device type and perhaps UE location).

For example, within a "Level-0 Trusted Domain," an Application Function, such as an AI agent instantiated within this domain, is allowed to request and acquire all available data by user devices being also local to the same domain, even those indicated as "private" or "confidential" without the need to provide additional authorization credentials. Depending on the level of trust in the part of the network where an AI agent is instantiated, the AI agent (assuming it is already authenticated and authorized by the respective NEF) will only be able to acquire data marked as private and/or secure, per the requirements of the specific trust level. Acquisition of private data external to a given trust level the AI agent is part of will only be possible upon providing additional authorization credentials.

Figure 7:
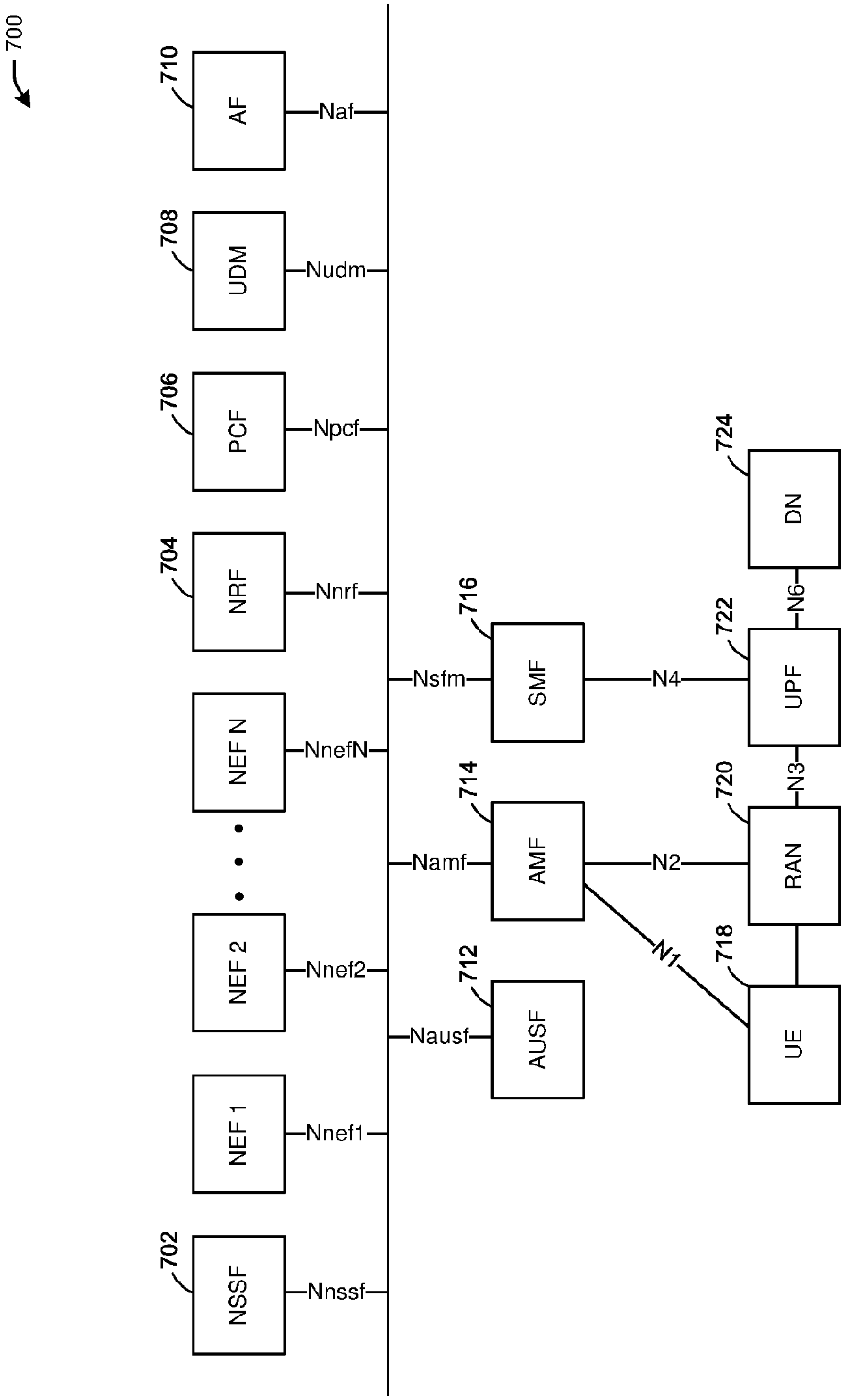
FIG. 7 illustrates a network, in accordance with one or more example embodiments of the present disclosure.

FIG. 7 illustrates a network 700, in accordance with one or more example embodiments of the present disclosure.

Figure 11:
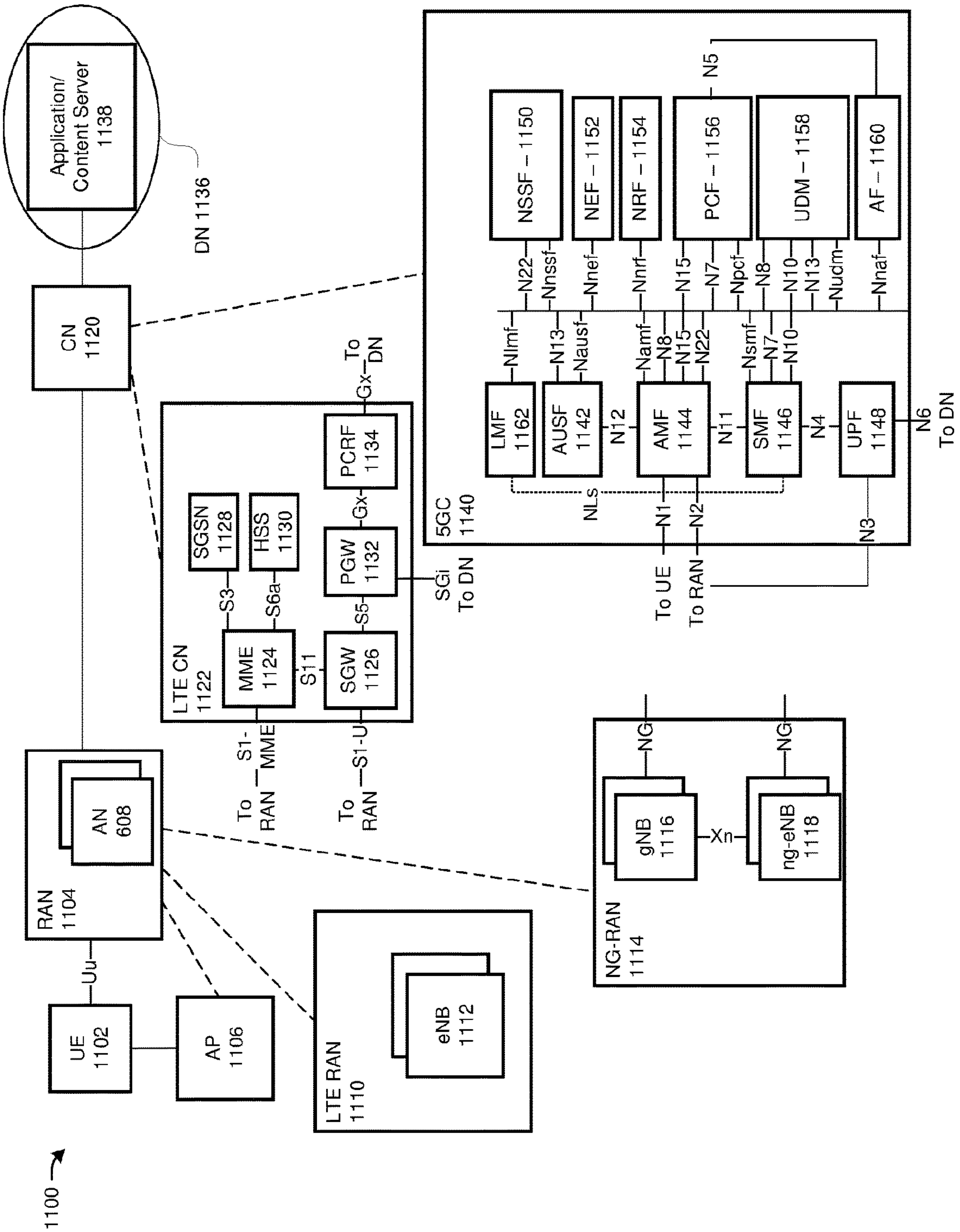
FIG. 11 illustrates a network, in accordance with one or more example embodiments of the present disclosure.

Referring to FIG. 7, the network 700 is similar to the network 1100 of FIG. 11, but with additional NEFs (e.g., NEF 1, NEF 2, . . . , NEF N) for different respective trust levels. The network 700 may include a NSSF 702, a NRF 704, a PCF 706, a UDM 708, an AF 710, an AUSF 712, a AMF 714, a SMF 716, a UE 718, a RAN 720, a UPF 722, and a DN 724, the functions of which are described in more detail with respect to FIG. 11.

The multiple NEFs in FIG. 7 may allow for the implementation of the trust level-based communication network framework 650 of FIG. 6.

Figure 8A:
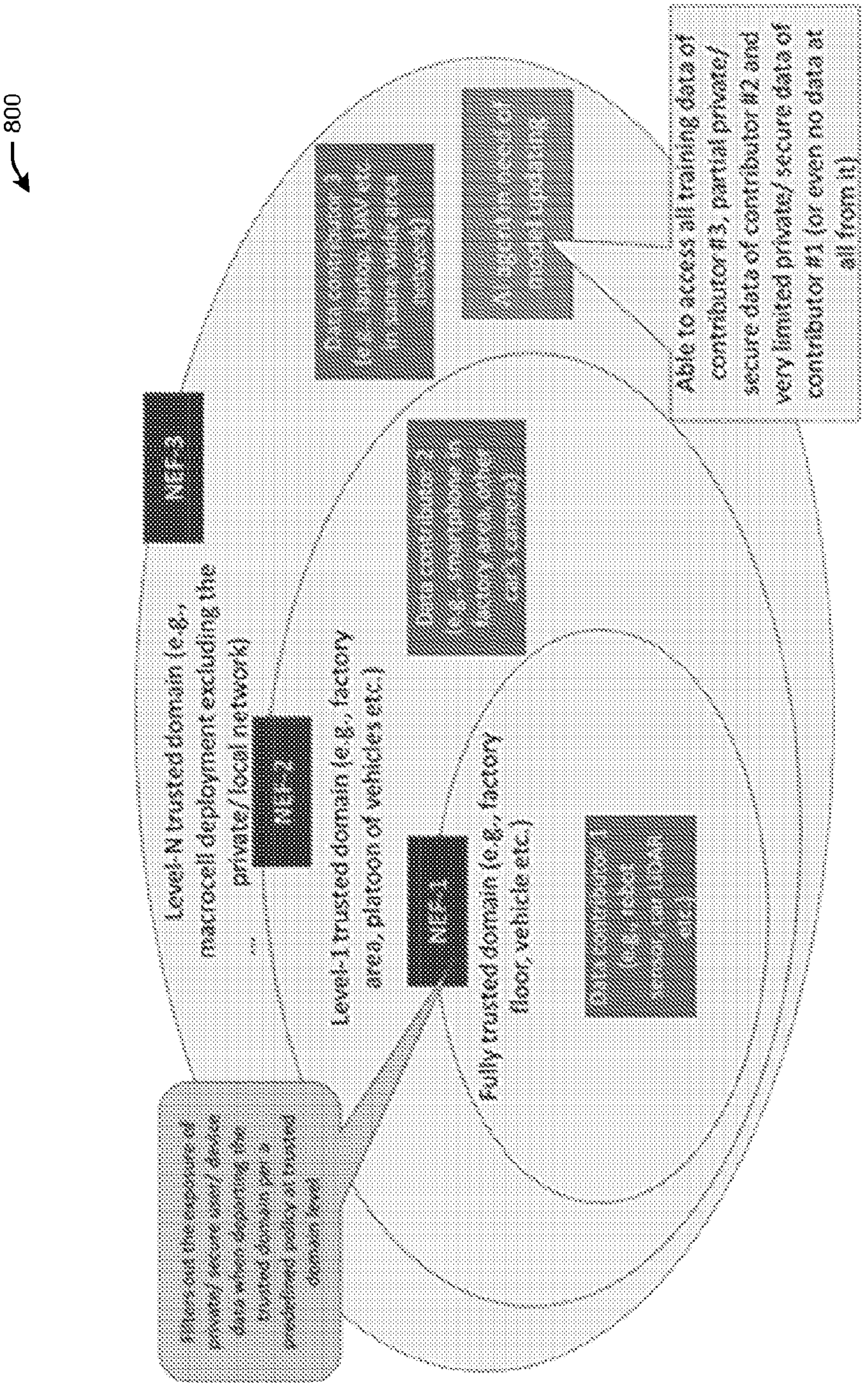
FIG. 8A illustrates an example of ML model training in a multi-trust level network environment, in accordance with one or more example embodiments of the present disclosure.

FIG. 8A illustrates an example multi-trust level network environment 800 for model updating purposes, in accordance with one or more example embodiments of the present disclosure.

FIG. 8A shows the principle of the proposed cross-domain trust level management approach when resource (e.g., data contributor and AI agent containing a model) location is considered as a contextual criterion of implementing learning/model training data ingress/egress filtering per a predefined policy at each trust level—in this case, a given NEF is considered as a "gatekeeper" entity implementing that policy.

Figure 8B:
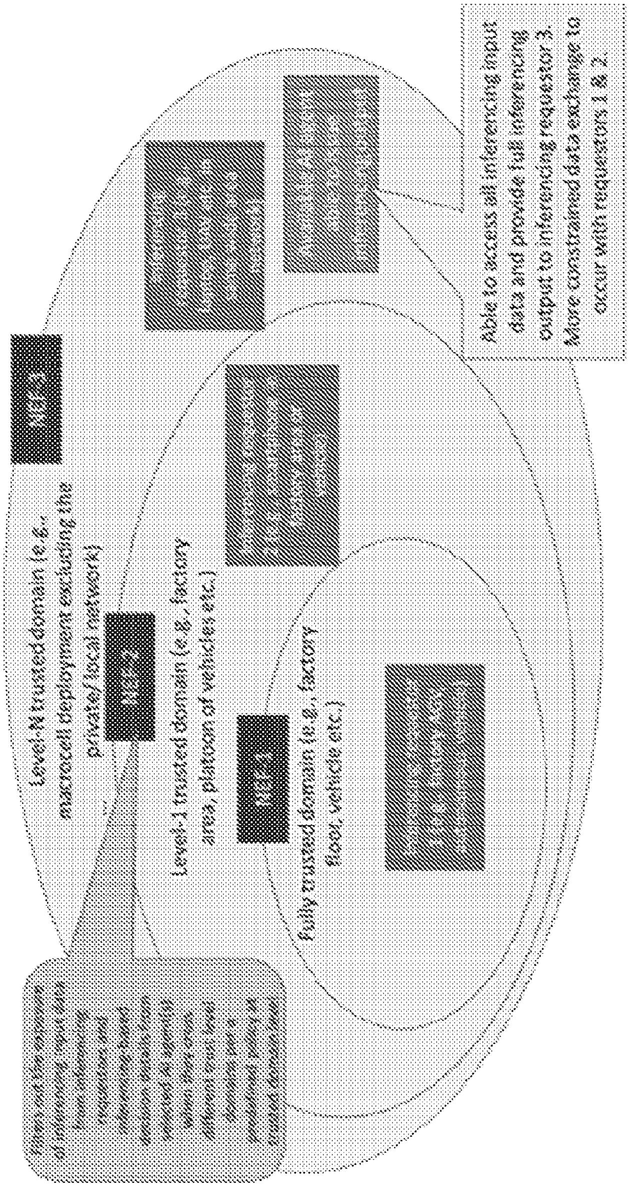
FIG. 8B illustrates an example of ML-based inferencing in a multi-trust level network environment, in accordance with one or more example embodiments of the present disclosure.

FIG. 8B illustrates an example multi-trust level network environment for ML-based inferencing purposes 850, in accordance with one or more example embodiments of the present disclosure.

FIG. 8B shows the principle when multiple AI Service consumers (e.g., inference decision requestors) instantiated at different trusted domains (per a contextual criterion, such as location) obtain inferencing output by an AI agent that is of a given level of trust. As before, the multiple NEFs act as "gatekeepers" of their respective trusted domains.

Figure 9:
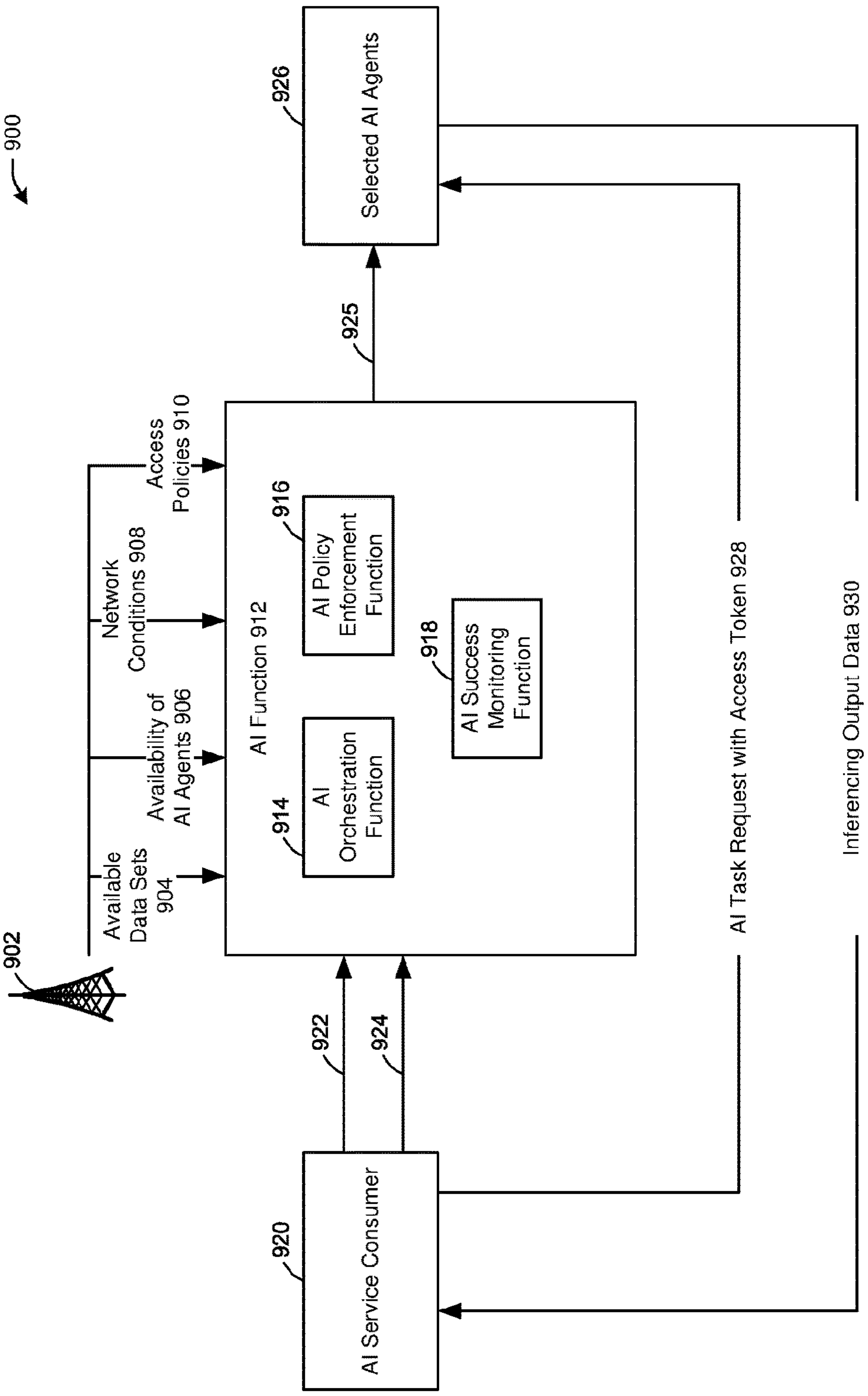
FIG. 9 illustrates an example Zero-Trust architecture, in accordance with one or more example embodiments of the present disclosure.

FIG. 9 illustrates an example Zero-Trust architecture 900, in accordance with one or more example embodiments of the present disclosure.

Referring to FIG. 9, the Zero-Trust architecture 900 may include a gNB 902 that may provide a quantity of available data sets 904, the availability of AI agents 906, network conditions 908, and access policies 910 to an AI function 912. The AI function 912 may include an AI orchestration function 914, an AI policy enforcement function 916, and an AI success monitoring function 918. An AI service consumer 920 (e.g., a client device such as the UE 102 of FIG. 1) may provide a data type 922 (e.g., labeled or unlabeled) and an inferencing task type 924 (e.g., classification, other) to the AI function 912. The AI function 912 may generate and provide a recommendation 925 of a ML learning topology, algorithm, and objective to one or more selected AI agents 926. The AI service consumer 920 may directly (i.e., without intervention of the AIS) send an AI task request 928 with an access token to the one or more selected AI agents 926, which may verify the request 928 and provide inferencing output data 930 to be used by the AI service consumer 920.

In one or more embodiments, the AI service producer (e.g., the one or more selected AI agents 926), the AI service consumer 920, and the AI function 912 are considered as resources (Tenet 1 of Table 1 above). Resources may use X.509 certificates for mutual authentication and TLS or QUIC for secure communication (Tenet 2 of Table 1 above). Access to an individual AI service producer is granted on a per-AI task basis by the AI policy enforcement function 916 (Policy Enforcement Point PEP) using OAuth 2.0 access tokens (Tenet 3 of Table 1 above). For deciding access, the AI policy enforcement function 916 uses network configured access policies (Policy Decision Point PDP), observable state of client identity, AI task type, requested AI resources, location information, other behavioral and environmental attributes (Tenet 4 of Table 1 above). As part of the access grant, the AI policy enforcement function 916 determines the trust level and includes it in the OAuth 2.0 access token. The AI service consumer 920 provides the AI task request together with the OAuth 2.0 access token to the selected AI Agent. The AI orchestration function 914 collects the current state of AI resources, network infrastructure and communications and uses it to improve its security posture (Tenet 7 of Table 1 above). The AI service producer performs data anonymization based on the AI service consumer 920 trust level as assigned by the AI policy enforcement function 916. In an example, Trust Level 0 provides the highest level of trust in which no output data filtering is performed. Accordingly, higher Trust Level numbers provide lower levels of trusts with more data filtering.

It is understood that the above descriptions are for purposes of illustration and are not meant to be limiting.

Figure 10:
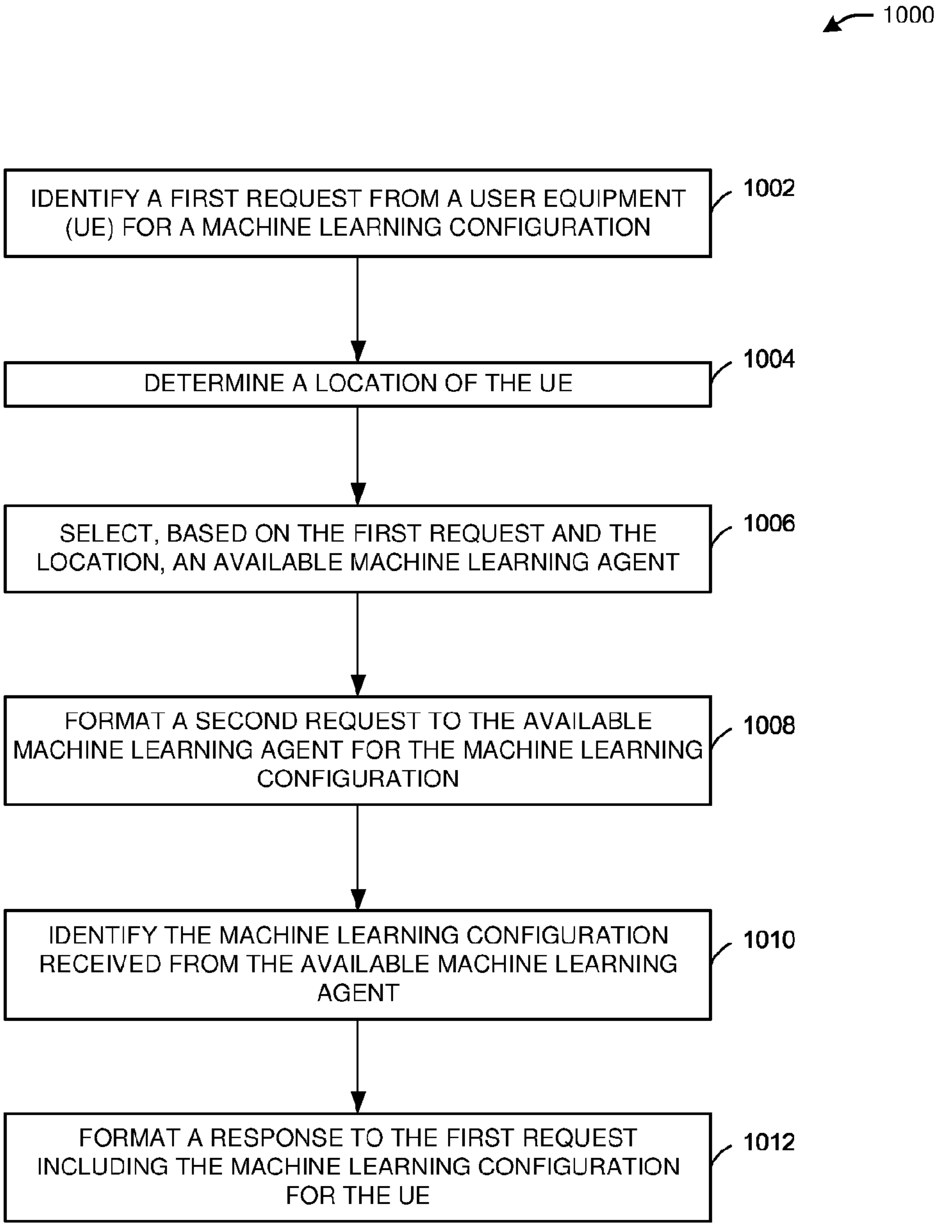
FIG. 10 illustrates a flow diagram of illustrative process for facilitating on-device machine learning operations, in accordance with one or more example embodiments of the present disclosure.

FIG. 10 illustrates a flow diagram of illustrative process 1000 for facilitating on-device machine learning operations, in accordance with one or more example embodiments of the present disclosure.

At block 1002, a device (e.g., the AIS 204 of FIG. 2) may identify a first request received from a UE (e.g., the AIS consumer 206 of FIG. 2) for a machine learning configuration.

At block 1004, the device may determine a location of the UE.

At block 1006, the device may select an available machine learning agent to provide the machine learning configuration based on the UE location and other criteria specified by the first request, such as the type of inferencing task to be performed by the UE, and based on other criteria such as machine learning agent coverage area and availability, where the UE is moving, and the like.

At block 1008, the device may format a second request to be transmitted to the available machine learning agent that the device selects. The second request may indicate that the UE requested the machine learning configuration.

At block 1010, the device may identify the machine learning configuration received from the available machine learning agent based on the second request.

At block 1012, the device may format a response to the first request to transmit to the UE to provide the machine learning configuration for local use at the UE.

It is understood that the above descriptions are for purposes of illustration and are not meant to be limiting.

FIG. 11 illustrates a network 1100, in accordance with one or more example embodiments of the present disclosure.

The network 1100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1100 may include a UE 1102, which may include any mobile or non-mobile computing device designed to communicate with a RAN 1104 via an over-the-air connection. The UE 1102 may be communicatively coupled with the RAN 1104 by a Uu interface. The UE 1102 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1100 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1102 may additionally communicate with an AP 1106 via an over-the-air connection. The AP 1106 may manage a WLAN connection, which may serve to offload some/all network traffic from the RAN 1104. The connection between the UE 1102 and the AP 1106 may be consistent with any IEEE 802.11 protocol, wherein the AP 1106 could be a wireless fidelity (Wi-Fi®) router. In some embodiments, the UE 1102, RAN 1104, and AP 1106 may utilize cellular-WLAN aggregation (for example, LWA/LWIP). Cellular-WLAN aggregation may involve the UE 1102 being configured by the RAN 1104 to utilize both cellular radio resources and WLAN resources.

The RAN 604 may include one or more access nodes, for example, AN 1108. AN 1108 may terminate air-interface protocols for the UE 1102 by providing access stratum protocols including RRC, PDCP, RLC, MAC, and L1 protocols. In this manner, the AN 1108 may enable data/voice connectivity between CN 1120 and the UE 1102. In some embodiments, the AN 608 may be implemented in a discrete device or as one or more software entities running on server computers as part of, for example, a virtual network, which may be referred to as a CRAN or virtual baseband unit pool. The AN 1108 be referred to as a BS, gNB, RAN node, eNB, ng-eNB, NodeB, RSU, TRxP, TRP, etc. The AN 1108 may be a macrocell base station or a low power base station for providing femtocells, picocells or other like cells having smaller coverage areas, smaller user capacity, or higher bandwidth compared to macrocells.

In embodiments in which the RAN 1104 includes a plurality of ANs, they may be coupled with one another via an X2 interface (if the RAN 1104 is an LTE RAN) or an Xn interface (if the RAN 1104 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1104 may each manage one or more cells, cell groups, component carriers, etc. to provide the UE 1102 with an air interface for network access. The UE 1102 may be simultaneously connected with a plurality of cells provided by the same or different ANs of the RAN 1104. For example, the UE 1102 and RAN 1104 may use carrier aggregation to allow the UE 1102 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios, the UE 1102 or AN 1108 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1104 may be an LTE RAN 1110 with eNBs, for example, eNB 1112. The LTE RAN 1110 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1104 may be an NG-RAN 1114 with gNBs, for example, gNB 1116, or ng-eNBs, for example, ng-eNB 1118. The gNB 1116 may connect with 5G-enabled UEs using a 5G NR interface. The gNB 1116 may connect with a 5G core through an NG interface, which may include an N2 interface or an N3 interface. The ng-eNB 1118 may also connect with the 5G core through an NG interface, but may connect with a UE via an LTE air interface. The gNB 1116 and the ng-eNB 1118 may connect with each other over an Xn interface.

In some embodiments, the NG interface may be split into two parts, an NG user plane (NG-U) interface, which carries traffic data between the nodes of the NG-RAN 1114 and a UPF 1148 (e.g., N3 interface), and an NG control plane (NG-C) interface, which is a signaling interface between the nodes of the NG-RAN 1114 and an AMF 1144 (e.g., N2 interface).

The NG-RAN 1114 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1102 can be configured with multiple BWPs where each BWP configuration has a different SCS. When a BWP change is indicated to the UE 1102, the SCS of the transmission is changed as well. Another use case example of BWP is related to power saving. In particular, multiple BWPs can be configured for the UE 1102 with different amount of frequency resources (for example, PRBs) to support data transmission under different traffic loading scenarios. A BWP containing a smaller number of PRBs can be used for data transmission with small traffic load while allowing power saving at the UE 1102 and in some cases at the gNB 1116. A BWP containing a larger number of PRBs can be used for scenarios with higher traffic load.

The RAN 1104 is communicatively coupled to CN 1120 that includes network elements to provide various functions to support data and telecommunications services to customers/subscribers (for example, users of UE 1102). The components of the CN 1120 may be implemented in one physical node or separate physical nodes. In some embodiments, NFV may be utilized to virtualize any or all of the functions provided by the network elements of the CN 1120 onto physical compute/storage resources in servers, switches, etc. A logical instantiation of the CN 1120 may be referred to as a network slice, and a logical instantiation of a portion of the CN 1120 may be referred to as a network sub-slice.

In some embodiments, the CN 1120 may be an LTE CN 1122, which may also be referred to as an EPC. The LTE CN 1122 may include MME 1124, SGW 1126, SGSN 1128, HSS 1130, PGW 1132, and PCRF 1134 coupled with one another over interfaces (or "reference points") as shown. Functions of the elements of the LTE CN 1122 may be briefly introduced as follows.

The MME 1124 may implement mobility management functions to track a current location of the UE 1102 to facilitate paging, bearer activation/deactivation, handovers, gateway selection, authentication, etc.

The SGW 1126 may terminate an S1 interface toward the RAN and route data packets between the RAN and the LTE CN 1122. The SGW 1126 may be a local mobility anchor point for inter-RAN node handovers and also may provide an anchor for inter-3GPP mobility. Other responsibilities may include lawful intercept, charging, and some policy enforcement.

The SGSN 1128 may track a location of the UE 1102 and perform security functions and access control. In addition, the SGSN 1128 may perform inter-EPC node signaling for mobility between different RAT networks; PDN and S-GW selection as specified by MME 1124; MME selection for handovers; etc. The S3 reference point between the MME 1124 and the SGSN 1128 may enable user and bearer information exchange for inter-3GPP access network mobility in idle/active states.

The HSS 1130 may include a database for network users, including subscription-related information to support the network entities' handling of communication sessions. The HSS 1130 can provide support for routing/roaming, authentication, authorization, naming/addressing resolution, location dependencies, etc. An S6a reference point between the HSS 1130 and the MME 1124 may enable transfer of subscription and authentication data for authenticating/authorizing user access to the LTE CN 1120.

The PGW 1132 may terminate an SGi interface toward a data network (DN) 1136 that may include an application/content server 638. The PGW 1132 may route data packets between the LTE CN 1122 and the data network 1136. The PGW 1132 may be coupled with the SGW 1126 by an S5 reference point to facilitate user plane tunneling and tunnel management. The PGW 1132 may further include a node for policy enforcement and charging data collection (for example, PCEF). Additionally, the SGi reference point between the PGW 1132 and the data network 1136 may be an operator external public, a private PDN, or an intra-operator packet data network, for example, for provision of IMS services. The PGW 1132 may be coupled with a PCRF 1134 via a Gx reference point.

The PCRF 1134 is the policy and charging control element of the LTE CN 1122. The PCRF 1134 may be communicatively coupled to the app/content server 1138 to determine appropriate QoS and charging parameters for service flows. The PCRF 1132 may provision associated rules into a PCEF (via Gx reference point) with appropriate TFT and QCI.

In some embodiments, the CN 1120 may be a 5GC 1140. The 5GC 1140 may include an AUSF 1142, AMF 1144, SMF 1146, UPF 1148, NSSF 1150, NEF 1152, NRF 1154, PCF 1156, UDM 1158, AF 1160, and LMF 1162 coupled with one another over interfaces (or "reference points") as shown. Functions of the elements of the 5GC 1140 may be briefly introduced as follows.

The AUSF 1142 may store data for authentication of UE 1102 and handle authentication-related functionality. The AUSF 1142 may facilitate a common authentication framework for various access types. In addition to communicating with other elements of the 5GC 1140 over reference points as shown, the AUSF 1142 may exhibit an Nausf service-based interface.

The AMF 1144 may allow other functions of the 5GC 1140 to communicate with the UE 1102 and the RAN 1104 and to subscribe to notifications about mobility events with respect to the UE 1102. The AMF 1144 may be responsible for registration management (for example, for registering UE 1102), connection management, reachability management, mobility management, lawful interception of AMF-related events, and access authentication and authorization. The AMF 1144 may provide transport for SM messages between the UE 1102 and the SMF 1146, and act as a transparent proxy for routing SM messages. AMF 1144 may also provide transport for SMS messages between UE 1102 and an SMSF. AMF 1144 may interact with the AUSF 1142 and the UE 1102 to perform various security anchor and context management functions. Furthermore, AMF 1144 may be a termination point of a RAN CP interface, which may include or be an N2 reference point between the RAN 1104 and the AMF 1144; and the AMF 1144 may be a termination point of NAS (N1) signaling, and perform NAS ciphering and integrity protection. AMF 1144 may also support NAS signaling with the UE 1102 over an N3IWF interface.

The SMF 1146 may be responsible for SM (for example, session establishment, tunnel management between UPF 1148 and AN 1108); UE IP address allocation and management (including optional authorization); selection and control of UP function; configuring traffic steering at UPF 1148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1144 over N2 to AN 1108; and determining SSC mode of a session. SM may refer to management of a PDU session, and a PDU session or "session" may refer to a PDU connectivity service that provides or enables the exchange of PDUs between the UE 1102 and the data network 1136.

The UPF 1148 may act as an anchor point for intra-RAT and inter-RAT mobility, an external PDU session point of interconnect to data network 1136, and a branching point to support multi-homed PDU session. The UPF 1148 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1148 may include an uplink classifier to support routing traffic flows to a data network.

The NSSF 1150 may select a set of network slice instances serving the UE 1102. The NSSF 1150 may also determine allowed NSSAI and the mapping to the subscribed S-NSSAIs, if needed. The NSSF 1150 may also determine the AMF set to be used to serve the UE 1102, or a list of candidate AMFs based on a suitable configuration and possibly by querying the NRF 1154. The selection of a set of network slice instances for the UE 1102 may be triggered by the AMF 1144 with which the UE 1102 is registered by interacting with the NSSF 1150, which may lead to a change of AMF. The NSSF 1150 may interact with the AMF 1144 via an N22 reference point; and may communicate with another NSSF in a visited network via an N31 reference point (not shown). Additionally, the NSSF 1150 may exhibit an Nnssf service-based interface.

The NEF 1152 may securely expose services and capabilities provided by 3GPP network functions for third party, internal exposure/re-exposure, AFs (e.g., AF 1160), edge computing or fog computing systems, etc. In such embodiments, the NEF 1152 may authenticate, authorize, or throttle the AFs. NEF 652 may also translate information exchanged with the AF 1160 and information exchanged with internal network functions. For example, the NEF 1152 may translate between an AF-Service-Identifier and an internal 5GC information. NEF 1152 may also receive information from other NFs based on exposed capabilities of other NFs. This information may be stored at the NEF 1152 as structured data, or at a data storage NF using standardized interfaces. The stored information can then be re-exposed by the NEF 1152 to other NFs and AFs, or used for other purposes such as analytics. Additionally, the NEF 1152 may exhibit an Nnef service-based interface.

The NRF 1154 may support service discovery functions, receive NF discovery requests from NF instances, and provide the information of the discovered NF instances to the NF instances. NRF 1154 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1154 may exhibit the Nnrf service-based interface.

The PCF 1156 may provide policy rules to control plane functions to enforce them, and may also support unified policy framework to govern network behavior. The PCF 1156 may also implement a front end to access subscription information relevant for policy decisions in a UDR of the UDM 1158. In addition to communicating with functions over reference points as shown, the PCF 1156 exhibit an Npcf service-based interface.

The UDM 1158 may handle subscription-related information to support the network entities' handling of communication sessions, and may store subscription data of UE 1102. For example, subscription data may be communicated via an N8 reference point between the UDM 1158 and the AMF 1144. The UDM 1158 may include two parts, an application front end and a UDR. The UDR may store subscription data and policy data for the UDM 1158 and the PCF 1156, and/or structured data for exposure and application data (including PFDs for application detection, application request information for multiple UEs 1102) for the NEF 1152. The Nudr service-based interface may be exhibited by the UDR 1121 to allow the UDM 1158, PCF 1156, and NEF 1152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1158 may exhibit the Nudm service-based interface.

The AF 1160 may provide application influence on traffic routing, provide access to NEF, and interact with the policy framework for policy control.

In some embodiments, the 5GC 1140 may enable edge computing by selecting operator/3rd party services to be geographically close to a point that the UE 1102 is attached to the network. This may reduce latency and load on the network. To provide edge-computing implementations, the 5GC 1140 may select a UPF 1148 close to the UE 1102 and execute traffic steering from the UPF 1148 to data network 1136 via the N6 interface. This may be based on the UE subscription data, UE location, and information provided by the AF 1160. In this way, the AF 1160 may influence UPF (re)selection and traffic routing. Based on operator deployment, when AF 1160 is considered to be a trusted entity, the network operator may permit AF 1160 to interact directly with relevant NFs. Additionally, the AF 1160 may exhibit an Naf service-based interface.

The data network 1136 may represent various network operator services, Internet access, or third party services that may be provided by one or more servers including, for example, application/content server 1138.

The LMF 1162 may receive measurement information (e.g., measurement reports) from the NG-RAN 1114 and/or the UE 1102 via the AMF 1144. The LMF 1162 may use the measurement information to determine device locations for indoor and/or outdoor positioning.

Figure 12:
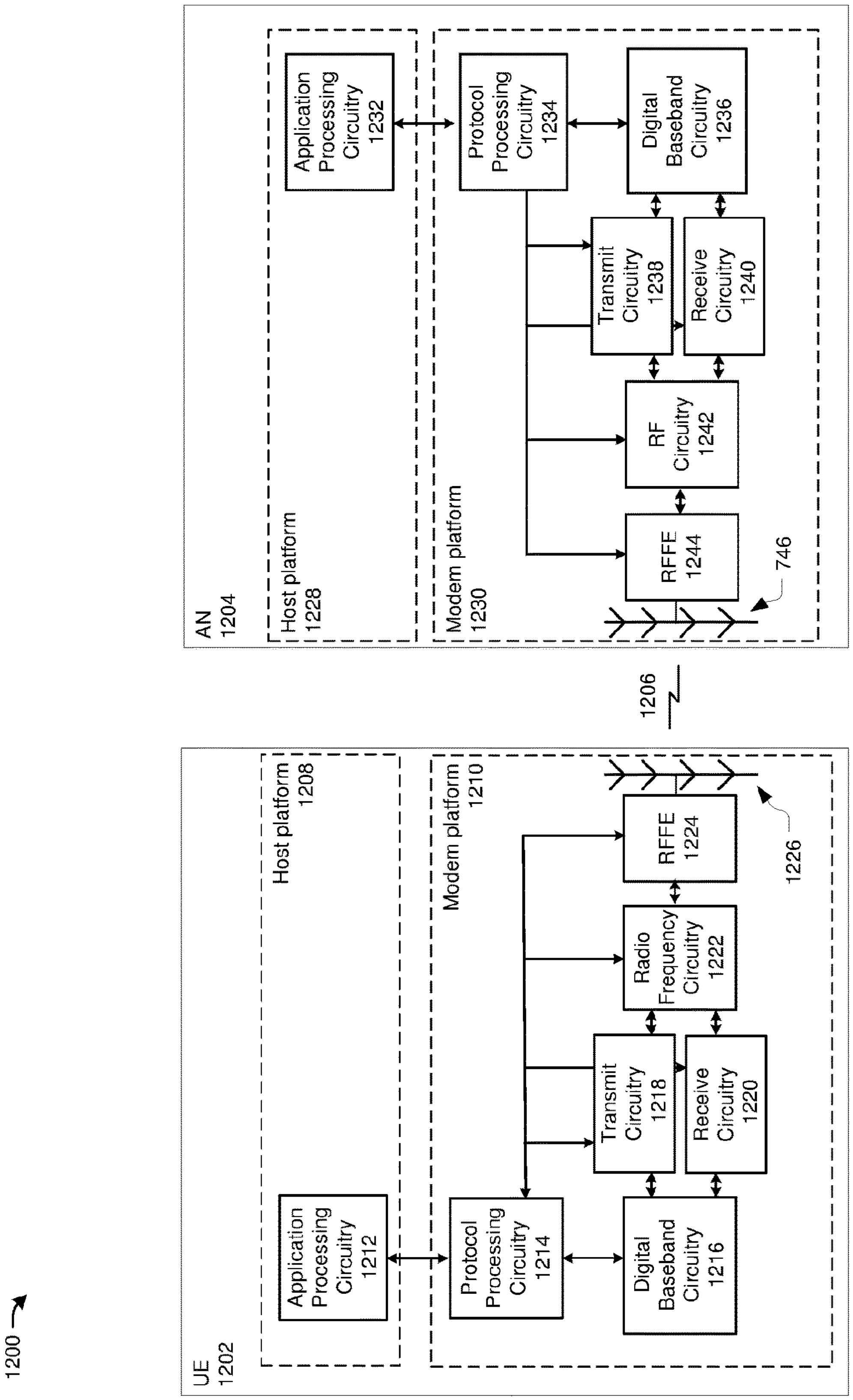
FIG. 12 schematically illustrates a wireless network, in accordance with one or more example embodiments of the present disclosure.

FIG. 12 schematically illustrates a wireless network 1200, in accordance with one or more example embodiments of the present disclosure.

The wireless network 1200 may include a UE 1202 in wireless communication with an AN 1204. The UE 1202 and AN 1204 may be similar to, and substantially interchangeable with, like-named components described elsewhere herein.

The UE 1202 may be communicatively coupled with the AN 1204 via connection 1206. The connection 1206 is illustrated as an air interface to enable communicative coupling, and can be consistent with cellular communications protocols such as an LTE protocol or a 5G NR protocol operating at mmWave or sub-6 GHz frequencies.

The UE 1202 may include a host platform 1208 coupled with a modem platform 1210. The host platform 1208 may include application processing circuitry 1212, which may be coupled with protocol processing circuitry 1214 of the modem platform 1210. The application processing circuitry 1212 may run various applications for the UE 1202 that source/sink application data. The application processing circuitry 1212 may further implement one or more layer operations to transmit/receive application data to/from a data network. These layer operations may include transport (for example UDP) and Internet (for example, IP) operations The protocol processing circuitry 1214 may implement one or more of layer operations to facilitate transmission or reception of data over the connection 1206. The layer operations implemented by the protocol processing circuitry 1214 may include, for example, MAC, RLC, PDCP, RRC and NAS operations.

The modem platform 1210 may further include digital baseband circuitry 1216 that may implement one or more layer operations that are "below" layer operations performed by the protocol processing circuitry 1214 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1210 may further include transmit circuitry 1218, receive circuitry 1220, RF circuitry 1222, and RF front end (RFFE) 1224, which may include or connect to one or more antenna panels 1226. Briefly, the transmit circuitry 1218 may include a digital-to-analog converter, mixer, intermediate frequency (IF) components, etc.; the receive circuitry 1220 may include an analog-to-digital converter, mixer, IF components, etc.; the RF circuitry 1222 may include a low-noise amplifier, a power amplifier, power tracking components, etc.; RFFE 1224 may include filters (for example, surface/bulk acoustic wave filters), switches, antenna tuners, beamforming components (for example, phase-array antenna components), etc. The selection and arrangement of the components of the transmit circuitry 1218, receive circuitry 1220, RF circuitry 1222, RFFE 1224, and antenna panels 1226 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1214 may include one or more instances of control circuitry (not shown) to provide control functions for the transmit/receive components.

A UE reception may be established by and via the antenna panels 1226, RFFE 1224, RF circuitry 1222, receive circuitry 1220, digital baseband circuitry 1216, and protocol processing circuitry 1214. In some embodiments, the antenna panels 1226 may receive a transmission from the AN 1204 by receive-beamforming signals received by a plurality of antennas/antenna elements of the one or more antenna panels 1226.

A UE transmission may be established by and via the protocol processing circuitry 1214, digital baseband circuitry 1216, transmit circuitry 1218, RF circuitry 1222, RFFE 1224, and antenna panels 1226. In some embodiments, the transmit components of the UE 1204 may apply a spatial filter to the data to be transmitted to form a transmit beam emitted by the antenna elements of the antenna panels 1226.

Similar to the UE 1202, the AN 1204 may include a host platform 1228 coupled with a modem platform 1230. The host platform 1228 may include application processing circuitry 1212 coupled with protocol processing circuitry 1234 of the modem platform 1230. The modem platform may further include digital baseband circuitry 1236, transmit circuitry 1238, receive circuitry 1240, RF circuitry 1242, RFFE circuitry 1244, and antenna panels 1246. The components of the AN 1204 may be similar to and substantially interchangeable with like-named components of the UE 1202. In addition to performing data transmission/reception as described above, the components of the AN 1208 may perform various logical functions that include, for example, RNC functions such as radio bearer management, uplink and downlink dynamic radio resource management, and data packet scheduling.

Figure 13:
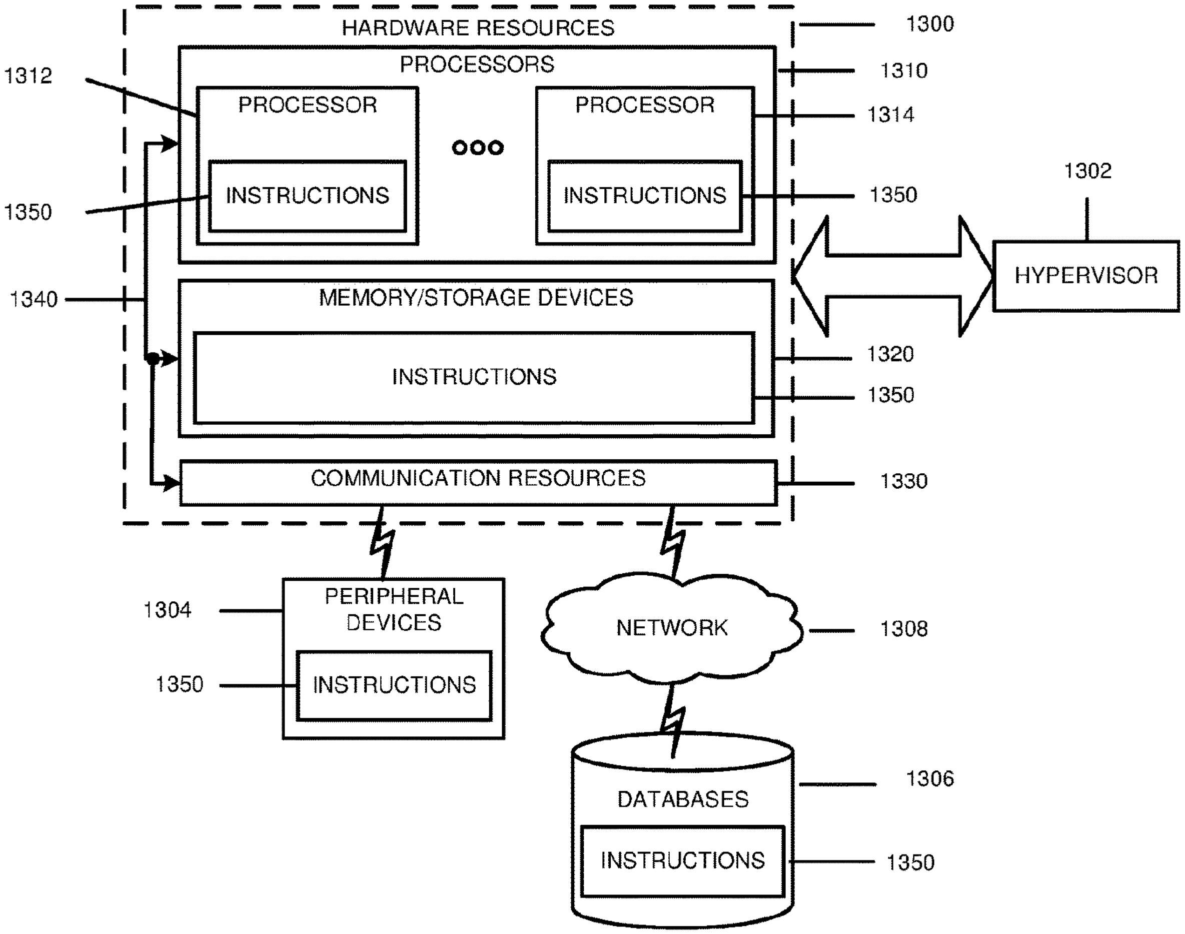
FIG. 13 is a block diagram illustrating components, in accordance with one or more example embodiments of the present disclosure.

FIG. 13 is a block diagram 1300 illustrating components, in accordance with one or more example embodiments of the present disclosure.

The components may be able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources including one or more processors (or processor cores) 1310, one or more memory/storage devices 1320, and one or more communication resources 1330, each of which may be communicatively coupled via a bus 1340 or other interface circuitry. For embodiments where node virtualization (e.g., NFV) is utilized, a hypervisor 1302 may be executed to provide an execution environment for one or more network slices/sub-slices to utilize the hardware resources.

The processors 1310 may include, for example, a processor 1312 and a processor 1314. The processors 1310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1320 may include main memory, disk storage, or any suitable combination thereof. The memory/storage devices 1320 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1330 may include interconnection or network interface controllers, components, or other suitable devices to communicate with one or more peripheral devices 1304 or one or more databases 1306 or other network elements via a network 808. For example, the communication resources 1330 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources from any combination of the peripheral devices 1304 or the databases 1306. Accordingly, the memory of processors 1310, the memory/storage devices 1320, the peripheral devices 1304, and the databases 1306 are examples of computer-readable and machine-readable media.

The following examples pertain to further embodiments.

Example 1 may be an apparatus of a radio access network (RAN) device for facilitating machine learning-based operations, the apparatus comprising processing circuitry coupled to storage, the processing circuitry configured to: identify a first request, received from a user equipment (UE) device, for a machine learning model configuration; determine a location of the UE device; select, based on the first request and the location, an available machine learning agent; format a second request to the available machine learning agent for the machine learning configuration; identify the machine learning configuration received from the available machine learning agent based on the second request; and format a response to the first request, the response comprising the machine learning configuration for the UE device.

Example 2 may include the apparatus of example 1 and/or some other example herein, wherein the first request comprises an indication of a task associated with at least one of movement of the UE device, a quality-of-service recommendation, energy efficiency, inferencing accuracy, or communication delay, and wherein to select the available machine learning agent is further based on the task.

Example 3 may include the apparatus of example 1 or example 2, and/or some other example herein, wherein the processing circuitry is further configured to: identify an update to the machine learning configuration, the update received from the available machine learning agent; and format the update to the machine learning configuration to transmit to the UE device.

Example 4 wherein the processing circuitry is further configured to: determine a second location of the UE device; select, based on the second location; a second available machine learning agent; format a third request for a second machine learning configuration to transmit to the second available machine learning agent, identify the second machine learning configuration received from the second available machine learning agent based on the third request; and format a second response to the first request, the second response comprising the second machine learning configuration for the UE device.

Example 5 may include the apparatus of example 1 and/or some other example herein, wherein the processing circuitry is further configured to: identify a second request, received from a second UE device, for a second machine learning model configuration; determine a second location of the second UE device; select, based on the second request and the second location, a second available machine learning agent; and format, for transmission to the UE device, an indication of the second available machine learning agent from which the UE device may request the second machine learning model configuration.

Example 6 may include the apparatus of example 1 and/or some other example herein, wherein the RAN device is associated with a network architecture associated with multiple network security domains each indicative of a respect data privacy trust level.

Example 7 may include the apparatus of example 6 and/or some other example herein, wherein the network architecture comprises a first network exposure function (NEF) associated with a first data privacy trust level, and a second NEF associated with a second data privacy trust level.

Example 8 may include the apparatus of example 7 and/or some other example herein, wherein the first data privacy trust level is greater than the second data privacy trust level, wherein the machine learning agent is associated with the first NEF, wherein all first training data for a second machine learning agent associated with the second NEF is available to the machine learning agent, and where a subset of second training data for the machine learning agent is unavailable to the second machine learning agent.

Example 9 may include the apparatus of example 7 and/or some other example herein, wherein the first data privacy trust level is greater than the second data privacy trust level, wherein the location is associated with the first NEF, wherein all first inferencing outputs, based on the machine learning configuration, from a second UE device at a second location associated with the second NEF are available to the machine learning agent, and where a subset of inferencing outputs from the UE device, based on the machine learning configuration, is unavailable to a second machine learning agent associated with the second NEF.

Example 10 may include the apparatus of example 6 and/or some other example herein, wherein the network architecture comprises a Zero-Trust architecture.

Example 11 may include the apparatus of example 6 and/or some other example herein, wherein the network architecture comprises a policy enforcement device associated with access control for machine learning requests comprising the first request.

Example 12 may include the apparatus of example 11 and/or some other example herein, wherein the policy enforcement device is further associated with selecting a machine learning task-based data privacy trust level.

Example 13 may include the apparatus of example 11 and/or some other example herein, wherein the policy enforcement device is further associated with assigning an OAuth access token associated with the first request.

Example 14 may include a computer-readable storage medium comprising instructions to cause processing circuitry of a user equipment device (UE) device, upon execution of the instructions by the processing circuitry, to: format a first request for a machine learning configuration to transmit to a radio access network (RAN) device; identify a response received from the RAN device based on the first request, the response comprising the machine learning configuration or an indication of an available machine learning agent from which to request the machine learning configuration; and update a machine learning model of the UE device based on the machine learning configuration.

Example 15 may include the computer-readable medium of example 14 and/or some other example herein, wherein the first request is transmitted by the UE device at a first time from a first location, and wherein execution of the instructions further causes the processing circuitry to: format a second request for a second machine learning configuration to transmit to the RAN device; identify a second response received from the RAN device based on the second request, the second response comprising the second machine learning configuration or a second indication of a second available machine learning agent from which to request the second machine learning configuration; and updated a machine learning model of the UE device further based on the second machine learning configuration.

Example 16 may include the computer-readable medium of example 14 and/or some other example herein, wherein the response comprises the indication, and wherein execution of the instructions further causes the processing circuitry to: format a second request to transmit to the available machine learning agent; and identify a second response received from the available machine learning agent, the second response comprising the machine learning configuration, wherein to update the machine learning model is further based on the second response.

Example 17 may include the computer-readable medium of example 16 and/or some other example herein, wherein execution of the instructions further causes the processing circuitry to: identify an update to the machine learning configuration received from the RAN device or the available machine learning agent; and update the machine learning model based on the update to the machine learning configuration.

Example 18 may include the computer-readable medium of example 14 and/or some other example herein, wherein the first request comprises an indication of a task associated with at least one of movement of the UE device, a quality-of-service recommendation, energy efficiency, inferencing accuracy, or communication delay, and wherein to select the available machine learning agent is further based on the task.

Example 19 may include a method for facilitating on device machine learning-based operations, the method comprising: identifying, by processing circuitry of a radio access network (RAN) device, a first request, received from a user equipment (UE) device, for a machine learning model configuration; determining, by the processing circuitry, a location of the UE device; selecting, by the processing circuitry, based on the first request and the location, an available machine learning agent; formatting, by the processing circuitry, a second request to the available machine learning agent for the machine learning configuration; identifying, by the processing circuitry, the machine learning configuration received from the available machine learning agent based on the second request; and formatting, by the processing circuitry, a response to the first request, the response comprising the machine learning configuration for the UE device.

Example 20 may include the method of example 19 and/or some other example herein, wherein the first request comprises an indication of a task associated with at least one of movement of the UE device, a quality-of-service recommendation, energy efficiency, inferencing accuracy, or communication delay, and wherein to select the available machine learning agent is further based on the task.

Example 21 may include the method of example 19 or 20 and/or some other example herein, further comprising: further comprising: identifying an update to the machine learning configuration, the update received from the available machine learning agent; and formatting the update to the machine learning configuration to transmit to the UE device.

Example 19 may include the method of example 16 and/or some other example herein, further comprising: detecting that all of the one or more EAS VNF instances were successfully instantiated, wherein the result is a deployment only when all of the one or more EAS VNF instances were successfully instantiated.

Example 22 may include the method of example 19 and/or some other example herein, further comprising: determining a second location of the UE device; selecting, based on the second location; a second available machine learning agent; formatting a third request for a second machine learning configuration to transmit to the second available machine learning agent; identifying the second machine learning configuration received from the second available machine learning agent based on the third request; and formatting a second response to the first request, the second response comprising the second machine learning configuration for the UE device.

Example 23 may include the method of example 19 and/or some other example herein, further comprising: identifying a second request, received from a second UE device, for a second machine learning model configuration; determining a second location of the second UE device; selecting, based on the second request and the second location, a second available machine learning agent; and formatting, for transmission to the UE device, an indication of the second available machine learning agent from which the UE device may request the second machine learning model configuration.

Example 24 may include an apparatus comprising means for: identifying, by a radio access network (RAN) device, a first request, received from a user equipment (UE) device, for a machine learning model configuration; determining a location of the UE device; selecting, based on the first request and the location, an available machine learning agent; formatting a second request to the available machine learning agent for the machine learning configuration; identifying the machine learning configuration received from the available machine learning agent based on the second request; and formatting a response to the first request, the response comprising the machine learning configuration for the UE device.

Example 25 may include one or more non-transitory computer-readable media comprising instructions to cause an electronic device, upon execution of the instructions by one or more processors of the electronic device, to perform one or more elements of a method described in or related to any of examples 1-24, or any other method or process described herein.

Example 26 may include an apparatus comprising logic, modules, and/or circuitry to perform one or more elements of a method described in or related to any of examples 1-24, or any other method or process described herein.

Example 27 may include a method, technique, or process as described in or related to any of examples 1-24, or portions or parts thereof.

Example 28 may include an apparatus comprising: one or more processors and one or more computer readable media comprising instructions that, when executed by the one or more processors, cause the one or more processors to perform the method, techniques, or process as described in or related to any of examples 1-24, or portions thereof.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Various embodiments are described below.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

Unless used differently herein, terms, definitions, and abbreviations may be consistent with terms, definitions, and abbreviations defined in 3GPP TR 21.905 v16.0.0 (2019 June) and/or any other 3GPP standard. For the purposes of the present document, the following abbreviations (shown in Table 2) may apply to the examples and embodiments discussed herein.

TABLE 2

| Abbreviations: | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |

TABLE 2-continued

| Abbreviations: | |
|---|---|
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance tableManagement Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |

TABLE 2-continued

| Abbreviations: | |
|---|---|
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |

TABLE 2-continued

| Abbreviations: | |
|---|---|
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |

TABLE 2-continued

| Abbreviations: | |
|---|---|
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |

TABLE 2-continued

| Abbreviations: | |
|---|---|
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |

TABLE 2-continued

| Abbreviations: | |
|---|---|
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |

TABLE 2-continued

| Abbreviations: | |
|---|---|
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | SS/PBCH Block Resource Indicator, Synchronization |
| Block SSBRI | Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |

TABLE 2-continued

| Abbreviations: | |
|---|---|
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Po |

What is claimed is:

1. An apparatus of a radio access network (RAN) device for facilitating machine learning-based operations, the apparatus comprising processing circuitry coupled to storage, the processing circuitry configured to:

identify a first request, received from a user equipment (UE) device, for a machine learning model configuration;

determine a location of the UE device;

select, based on the first request and the location, an available machine learning agent from a plurality of registered machine learning agents;

format a second request to the selected available machine learning agent for the machine learning configuration to retrieve a specific neural network parameter set;

identify the machine learning configuration received from the selected available machine learning agent based on the second request; and format a response to the first request, the response comprising the machine learning configuration for the UE device.

2. The apparatus of claim 1, wherein the first request comprises an indication of a task associated with at least one of movement of the UE device, a quality-of-service recommendation, energy efficiency, inferencing accuracy, or communication delay, and wherein to select the available machine learning agent is further based on the task.

3. The apparatus of claim 1, wherein the processing circuitry is further configured to:

identify an update to the machine learning configuration, the update received from the available machine learning agent; and format the update to the machine learning configuration to transmit to the UE device.

4. The apparatus of claim 1, wherein the processing circuitry is further configured to:

determine a second location of the UE device;

select, based on the second location; a second available machine learning agent;

format a third request for a second machine learning configuration to transmit to the second available machine learning agent, identify the second machine learning configuration received from the second available machine learning agent based on the third request; and format a second response to the first request, the second response comprising the second machine learning configuration for the UE device.

5. The apparatus of claim 1, wherein the processing circuitry is further configured to:

identify a second request, received from a second UE device, for a second machine learning model configuration;

determine a second location of the second UE device;

select, based on the second request and the second location, a second available machine learning agent; and format, for transmission to the UE device, an indication of the second available machine learning agent from which the UE device may request the second machine learning model configuration.

6. The apparatus of claim 1, wherein the RAN device is associated with a network architecture associated with multiple network security domains each indicative of a respect data privacy trust level.

7. The apparatus of claim 6, wherein the network architecture comprises a first network exposure function (NEF) associated with a first data privacy trust level, and a second NEF associated with a second data privacy trust level.

8. The apparatus of claim 7, wherein the first data privacy trust level is greater than the second data privacy trust level, wherein the machine learning agent is associated with the first NEF, wherein all first training data for a second machine learning agent associated with the second NEF is available to the machine learning agent, and where a subset of second training data for the machine learning agent is unavailable to the second machine learning agent.

9. The apparatus of claim 7, wherein the first data privacy trust level is greater than the second data privacy trust level, wherein the location is associated with the first NEF, wherein all first inferencing outputs, based on the machine learning configuration, from a second UE device at a second location associated with the second NEF are available to the machine learning agent, and where a subset of inferencing outputs from the UE device, based on the machine learning configuration, is unavailable to a second machine learning agent associated with the second NEF.

10. The apparatus of claim 6, wherein the network architecture comprises a Zero-Trust architecture.

11. The apparatus of claim 6, wherein the network architecture comprises a policy enforcement device associated with access control for machine learning requests comprising the first request.

12. The apparatus of claim 11, wherein the policy enforcement device is further associated with selecting a machine learning task-based data privacy trust level.

13. The apparatus of claim 11, wherein the policy enforcement device is further associated with assigning an OAuth access token associated with the first request.

14. A non-transitory computer-readable storage medium comprising instructions to cause processing circuitry of a user equipment device (UE) device, upon execution of the instructions by the processing circuitry, to:

format a first request for a machine learning configuration to transmit to a radio access network (RAN) device;

identify a response received from the RAN device based on the first request, the response comprising the machine learning configuration retrieved by the RAN device from a specific machine learning agent selected from a plurality of registered machine learning agents or an indication of an available machine learning agent from which to request the machine learning configuration; and update a machine learning model of the UE device based on the machine learning configuration.

15. The non-transitory computer-readable medium of claim 14, wherein the first request is transmitted by the UE device at a first time from a first location, and wherein execution of the instructions further causes the processing circuitry to:

format a second request for a second machine learning configuration to transmit to the RAN device;

identify a second response received from the RAN device based on the second request, the second response comprising the second machine learning configuration or a second indication of a second available machine learning agent from which to request the second machine learning configuration; and updated a machine learning model of the UE device further based on the second machine learning configuration.

16. The non-transitory computer-readable medium of claim 14, wherein the response comprises the indication, and wherein execution of the instructions further causes the processing circuitry to:

format a second request to transmit to the available machine learning agent; and identify a second response received from the available machine learning agent, the second response comprising the machine learning configuration, wherein to update the machine learning model is further based on the second response.

17. The non-transitory computer-readable medium of claim 16, wherein execution of the instructions further causes the processing circuitry to:

identify an update to the machine learning configuration received from the RAN device or the available machine learning agent; and update the machine learning model based on the update to the machine learning configuration.

18. The non-transitory computer-readable medium of claim 14, wherein the first request comprises an indication of a task associated with at least one of movement of the UE device, a quality-of-service recommendation, energy efficiency, inferencing accuracy, or communication delay, and wherein to select the available machine learning agent is further based on the task.

19. A method for facilitating on device machine learning-based operations, the method comprising:

identifying, by processing circuitry of a radio access network (RAN) device, a first request, received from a user equipment (UE) device, for a machine learning model configuration;

determining, by the processing circuitry, a location of the UE device;

selecting, by the processing circuitry, based on the first request and the location, an available machine learning agent from a plurality of registered machine learning agents;

formatting, by the processing circuitry, a second request to the selected available machine learning agent for the machine learning configuration to retrieve a specific neural network parameter set;

identifying, by the processing circuitry, the machine learning configuration received from the available machine learning agent based on the second request; and formatting, by the processing circuitry, a response to the first request, the response comprising the machine learning configuration for the UE device.

20. The method of claim 19, wherein the first request comprises an indication of a task associated with at least one of movement of the UE device, a quality-of-service recommendation, energy efficiency, inferencing accuracy, or communication delay, and wherein to select the available machine learning agent is further based on the task.

* * * * *